(12) United States Patent
Desimone

(10) Patent No.: US 12,488,290 B2
(45) Date of Patent: Dec. 2, 2025

(54) SYSTEM AND METHOD FOR A DIGITAL TICKETING PLATFORM

(71) Applicant: Jason Desimone, Manhasset, NY (US)

(72) Inventor: Jason Desimone, Manhasset, NY (US)

( * ) Notice: Subject to any disclaimer, the term of this patent is extended or adjusted under 35 U.S.C. 154(b) by 0 days.

(21) Appl. No.: 18/236,913

(22) Filed: Aug. 22, 2023

(65) Prior Publication Data

US 2024/0127128 A1  Apr. 18, 2024

Related U.S. Application Data

(60) Provisional application No. 63/401,084, filed on Aug. 25, 2022.

(51) Int. Cl.
| | |
|---|---|
| *G06Q 10/02* | (2012.01) |
| *G06Q 20/36* | (2012.01) |
| *G06Q 30/0207* | (2023.01) |
| *H04L 9/00* | (2022.01) |

(52) U.S. Cl.
CPC .......... *G06Q 10/02* (2013.01); *G06Q 20/367* (2013.01); *G06Q 30/0224* (2013.01); *H04L 9/50* (2022.05)

(58) Field of Classification Search
CPC ............ G06Q 10/02; G06Q 10/06311; G06Q 10/109; G06F 16/9554
USPC .......................................................... 705/5
See application file for complete search history.

(56) References Cited

U.S. PATENT DOCUMENTS

| | | | | |
|---|---|---|---|---|
| 2021/0357893 A1* | 11/2021 | Kang | ................. | G06Q 20/1235 |
| 2021/0374693 A1* | 12/2021 | La Salle | ............ | G06Q 20/0655 |
| 2022/0210266 A1* | 6/2022 | Kats | .................. | H04M 3/42042 |

OTHER PUBLICATIONS

"A Blockchain Based Decentralized Computing and NFT Infrastructure for Game Networks" Published by IEEE (Year: 2020).*

* cited by examiner

*Primary Examiner* — Zeina Elchanti
(74) *Attorney, Agent, or Firm* — Olivo IP Law Group, P.C.; John W. Olivo, Jr.

(57) ABSTRACT

The present disclosure describes a system and method for a cryptographic and digital ticketing platform that extends the interconnectivity between artist, event and attendees. Digital articles are secured by way of blockchain technology, as well as cryptographic keys that document these interactions within a network and on a digital wallet. Tickets and articles are escrowed, locked, or staked for the purpose of generating a yield or return on the investment for authenticated and verified event attendee. The ecosystem for event and fan interactions is thereby elevated by offering incentives for attendance, allowing artists, attendees, and venues to share and deposit digital media into encrypted wallets, and offering rare digital assets in addition to a monetary return on the investment of their ticket or as a reward for their fan loyalty. Post-event, artists and events distribute digital rewards, collectibles, NFTs and exclusive interactions to event attendees and loyal fans, through one central application. Biometrics and geolocation tagging may also assist with attendance and monitorization of attendees for potential rewards and interactions.

20 Claims, 31 Drawing Sheets

TICKET ADMIN

SYSTEM AND METHOD FOR A DIGITAL TICKETING PLATFORM

CROSS REFERENCE TO RELATED APPLICATIONS

This application claims the benefit of U.S. Provisional Application Ser. No. 63/401,084 filed Aug. 25, 2022, the contents of which are incorporated herein.

BACKGROUND OF THE INVENTION

Live entertainment events have amassed fortunes yearly. Venues have now evolved to host a variety of entertainment types, such as sporting, concerts, showings, theatrical, business and even personal events. To attend events, a ticket is a requisite upon entry. Sometimes these tickets are physical copies with elaborate markings that confirm its authenticity, whereas other times they are digital copies which may be sold, traded, and acquired from the source or through third party ticketing apps. Digital copies are also equipped with their own authentication methods, for example—they may arrive with a series of unique numbers, a QR or bar code, or other type of digital identification. In present times, mobile delivery has become the standard for many event attendees.

Digital tickets assist greatly with convenience; however, the digital ticket market enables scalpers who purchase digital tickets en masse and then resell them at extremely high rates on ticketing companies. While this is beneficial for the sellers (and ticketing companies which have a monopoly in the industry from extracting fees alone) it is oftentimes an obstacle for bona fide fans of an artist or personality who want to see them perform and can no longer afford to because of the extravagant price hikes. Consequently, there are no benefits for the artists who don't receive any commissions from their tickets being resold at a higher rate. While their name, image and likeness are used to exaggerate the cost of tickets, they reap none of the extended profits from those transactions.

The present invention remedies these obstacles by providing fans an option to purchase tickets, either on or off the blockchain, and stake them. Staking, or "locking" the tickets, is a way users may validate ownership over the digital item and pledge their commitment to holding onto that item in exchange for rewards. This allows users to earn rewards on their holdings, which in this example, is an event ticket. When event goers stake their tickets, the tickets become non-transferrable, non-exchangeable and are unable to be redeemed by others. That is, their ticket is exclusively, wholly theirs and they are verifying their intent to attend the said event. The benefit of this is that once it is staked, the ticket can produce a significant return in the form of a monetary value or, by way of example and not of limitation, cryptocurrency and tokens, non-fungible tokens, memorabilia, digital artifacts, access passes, etcetera. This is explored through a platform which features an encrypted and cryptographic wallet for the user's assets. Ultimately, these features incentivize and reward attendance for ticket holders. As opposed to missing out on an opportunity to see their favorite artist or athlete play because of inflated pricing, users can be rewarded for locking their tickets and guaranteeing their attendance early, in exchange for a return on their investment, either monetary or non-monetary.

SUMMARY OF INVENTION

The present invention reinvigorates the event ticketing landscape by creating a digital ecosystem for all concert attendees, where they can accrue rewards and unique digital assets by proving their attendance and fandom. All the wallets of attendees who scanned their QR code or identification code upon entry have their own unique IDs stored within the event or artist's wallet by design, allowing for a centralized distribution infrastructure with more intimate artist and fan relations. This distribution infrastructure, or "airdrops," enable the event or artist to directly and instantaneously deposit digital assets en masse into all the wallets that scanned in at the event and proved their attendance. Moreover, the presented solution encourages the purchasing of tickets early, as a portion of the cost can be recouped through staking, actual event attendance, distribution of rewards to the event goer, attendees, artist or even the event itself through the app, therefore creating new monetization and incentive structures, as well as a distribution platform to extend and embrace a new correspondence between the artist, fan and event relations. For example, assets such as non-fungible tokens and other digital collectibles can be dispersed among event goers' wallets. Artists may also sell and disperse to their fans NFT passes, loyalty membership cards, or allow their fans to simply use tickets.

The digital tickets (these tokens) may have a limit set for artists to control how much they are priced in the secondary market in order to prevent inflated pricing using smart contracts or other traditional means, such as codes that set price caps, or may not be resold at all depending on the exclusivity—by way of example and not limitation, a loyalty membership may only be resold to other parties with a specific amount of concert entries or visits, or an NFT pass may only be sold to someone at a specific show from a specific date. In essence, the non-fungible token's exclusivity is emphasized by "token-gating" capabilities by way of reading encrypted wallets, which allow users to see which fans hold exclusive assets. Specific fans may also be targeted for additional benefits, such as more intimate interactions with an artist through the same or different application, or the opportunity to meet an artist, package upgrades, special invites to VIP events and experiences, etc. all depending on their fan status as reflected by their encrypted wallet. "Token gating" is used to reference selecting which individuals to distribute perks to based off the tokens they hold and have acquired in their encrypted wallets. These determinations can be made by scanning their wallets by way of a QUR code or by reading different wallet URLs on a blockchain (distributed ledger). This feature creates a secondary market around tangential non-fungible tokens and not just tickets alone and creates a more inter-personal relationship between fans and artists who can bond over a shared art and token distributed at an event that cannot be as easily distributed, and if distributed, maintains a record on-chain.

Another feature of the present invention includes an admin account for the event. Every encrypted and cryptographic wallet that holds the event asset is forwarded to the admin account, and the admin account also records the wallet of all attendees that scan in at the event. Current ticketing infrastructure does not allow for product from the event to be distributed seamlessly to attendees, or fans, in a practical manner. For example, some ticketing platforms would have to acquire a physical address of all attendees to send materials to, which is exhaustive and impractical. The presence of an encrypted wallet that has drag and drop, or "airdrop," capabilities allows anyone at the event with the digital wallet to share commemorative non-fungible tokens, collectibles, and any other digital asset to a targeted group of attendees at any point during or after the event, thereby changing the event-fan dynamic.

In one aspect of the present invention, the digital asset is protected from duplication. This is because tickets can be purchased on or off the blockchain and be connected to a secure, encrypted wallet. Cryptographic schemes have helped enable immutable digital assets that may exist as the center of a system and affirm that there is one sole copy and owner of a ticket. Through these schemes, venues can prevent fraud as the ledger is indicative of the single owner of the ticket and all interactions that occurred therein. In another aspect, users are not required to hold cryptocurrency in order to complete a transaction. Traditionally, in order to transact on the blockchain, a user would have to pay a "gas" fee. "Gas" is the fee required to successfully conduct a transaction or execute a contract on a specific blockchain or distributed ledger, priced in the native token or cryptocurrency for that specific blockchain (ex; ETH on the Ethereum blockchain). For the present invention, the "gas" fees for each transaction are covered for the user in the backend; therefore, they are able to operate on the blockchain without having to directly engage with a cryptographic exchange or transfer. The same applies for non-fungible tokens distributed by an artist. All cryptographic exchanges may be implemented using schemas that can be implemented in a manner that disguises the blockchain exchange but maintains the ledger to make the process less daunting for those who are interested in blockchain but do not wish to directly engage with an exchange platform. This removes the risks associated with users having to purchase cryptocurrencies or tokens and send them to the platform in order to transact and interact.

If a user purchases a ticket and adds it to their wallet, they may stake the ticket and hold it until they are admitted into the entertainment event. The user may purchase the ticket on a blockchain network, for example, Solana, or other network platforms, with the option of transfer into an encrypted wallet. Blockchain technology may be used to support the platform, but it should be noted that the present system and method has the infrastructure to also operate on peer-to-peer networks, or other traditional networks. Moreover, if a ticket is recorded as a transaction on the blockchain and is purchased at a flipped price, a user may be able to generate the difference by attending the event. Staked cryptographic tickets within the wallet are unable to be copied, exchanged, or transferred unless they are willing to withdraw their benefits.

Upon scanning in for entry, with their ticket associated with their unique wallet ID, they may experience a return on their ticket, akin to an investment asset. Geolocation tracking will be utilized to assess if a user is present at the event in order to ensure whether they will reap the benefits of a stake. Other features such as biometric tracking are also implemented and utilized for a variety of rewards and offers, independent of entry. Upon entry to any venue or event, the scanned digital ticket, wallet, or unique identification code enables access to an attendee's staked reward; however, the geolocation tracking, and biometrics may be implemented to extend to rewards during or after the event.

A user will not be able to reap the benefits of staking a ticket if they choose to unstake or sell a ticket prior to the event, as one can only accept the yield and interest upon entry, or "Proof of Attendance" (POA). A user can only claim rewards they have accrued up until that point from staking. All tickets on the platform that were purchased through the platform may also be tracked and feature geolocation tagging and biometric technology and verification to affirm whether an authenticated purchaser is present at the event. This approach incentivizes and rewards event attendance, as those who do not scan in at the event, unstake their ticket to resell or exchange and send their ticket prior to the event have forfeited their rewards. All rewards can either be kept by the platform, be redistributed among other attendees, or be sent to the event itself. This ensures that the original purchaser can hold on to their ticket as opposed to reselling it for extortionate values and still get a significant return on investment. In addition, the artist may also be able to take a portion of these profits.

In another embodiment of the present invention, the platform may offer an insurance policy for qualifying events. Users may opt in or out of an insurance plan and still be able to reap some of the rewards of staking, such as yield and interest, or the perks one would accrue from their proof of attendance, such as rare non-fungible tokens or other memorabilia that may be distributed at the event. In events where the tickets are distributed as non-fungible tokens, artists may employ control over how much they are resold for in the secondary market by setting specific parameters in the smart contracts to prevent inflated pricing and combat bots from purchasing tickets and artificially inflating the price to exorbitant amounts on secondary markets by controlling the supply of tickets. Bots and users who mass-purchase tickets ultimately gatekeep authentic fans from purchasing tickets to events by inflating the prices for events, which put the average fan at a huge disadvantage. The present invention remedies this by setting limitations automatically enforced through smart contracts on the resale value of tickets, which effectively puts a price ceiling on the ticket marketplace, to prevent these incidences from occurring.

The aforementioned smart contracts can be used in a myriad of ways. Because the platform operates on a blockchain-based medium, artists could build royalties or fees into a smart contract to retain more value from secondary sales of tickets. This helps artists still generate profits from secondary sales and retain value from those secondary sales as opposed to allowing a singular intermediary to extract profit from it.

In yet another embodiment, there may be loyalty levels for attendees that are determined by the number of concerts they've attended, or the rarity of digital assets they've acquired. For example, an attendee who has made their way to nine concerts across the country may be able to redeem special gifts, exclusive offers, and merchandising from either the individual they are supporting, or the platform. There may be different tiers associated with concert attendees based on their participation in events, and there will be a database which will display the number of concerts they've attended, the time spent at concerts, or even their fan ranking—for example, if they are in the top 5% of fans, and so on. Events may collaborate on perks with the disclosed platform. User wallets are also maintained and tracked so artists and events have a holistic overview of the attendee's engagement. In essence, a user may be able to earn a status in the platform's networks and unlock various perks through micro-contributions such as liking or sharing content. User loyalty is rewarded by earning tokens among other perks, such as direct communication from an artist or exclusive access to future shows, NFTs or digital assets, all within one central platform.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE INVENTION

Figure 1A:
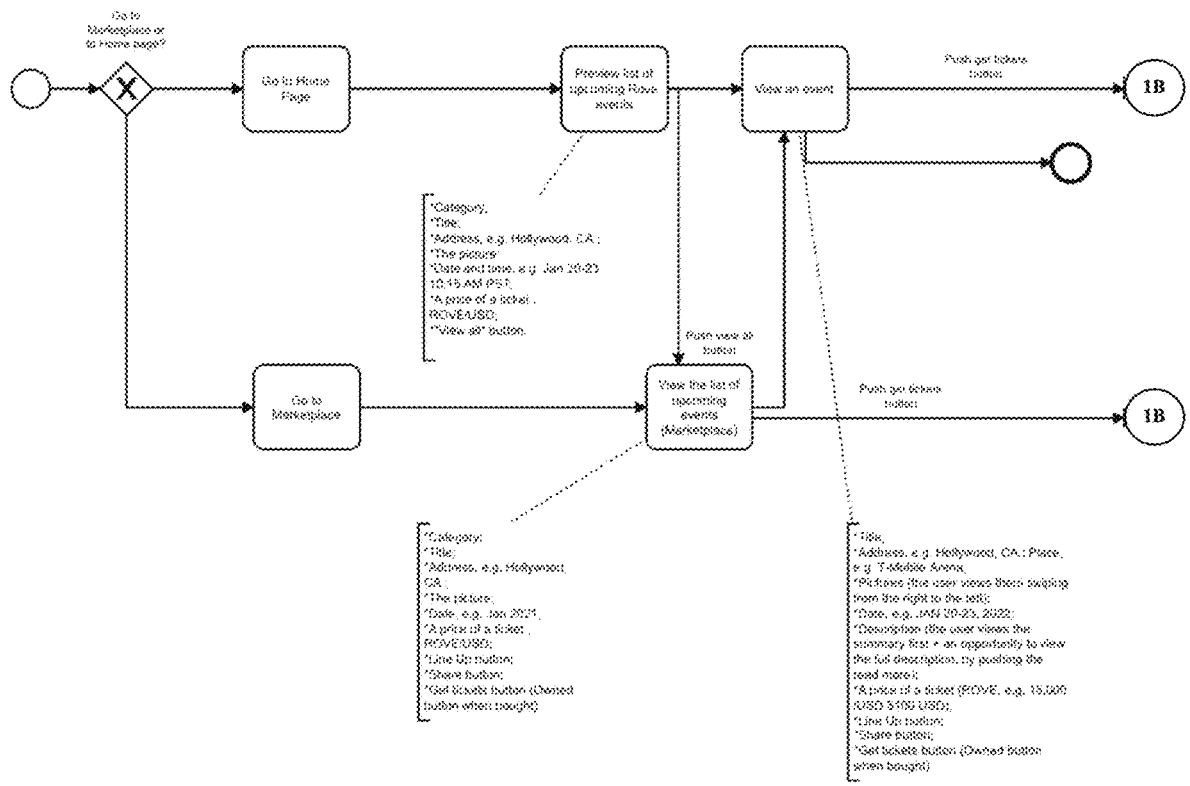
FIG. 1A is a diagram displaying the introductory interface and the event ticket purchasing.

FIG. 1A is a schematic of the marketplace and home page interface. A user is given the option to go to either the marketplace or home page. If they select home page, they may preview a list of upcoming events, as well as pertinent information such as the event category, title, address, date and time, a picture, and the price of the ticket in both cryptocurrency and US Dollar, or whatever currency is compatible with their geographical location. If a user presses the 'view all' button, they can view a list of all upcoming events through the marketplace. When people view events, it also provides all the aforementioned details, such as the event's title, address, pictures, the date, a description of the event, a price, as well as a line up button, share button, and a get tickets button. When a user selects 'get tickets' they are then forwarded to a page executing the task, and they'll be prompted to provide details.

Figure 1B:
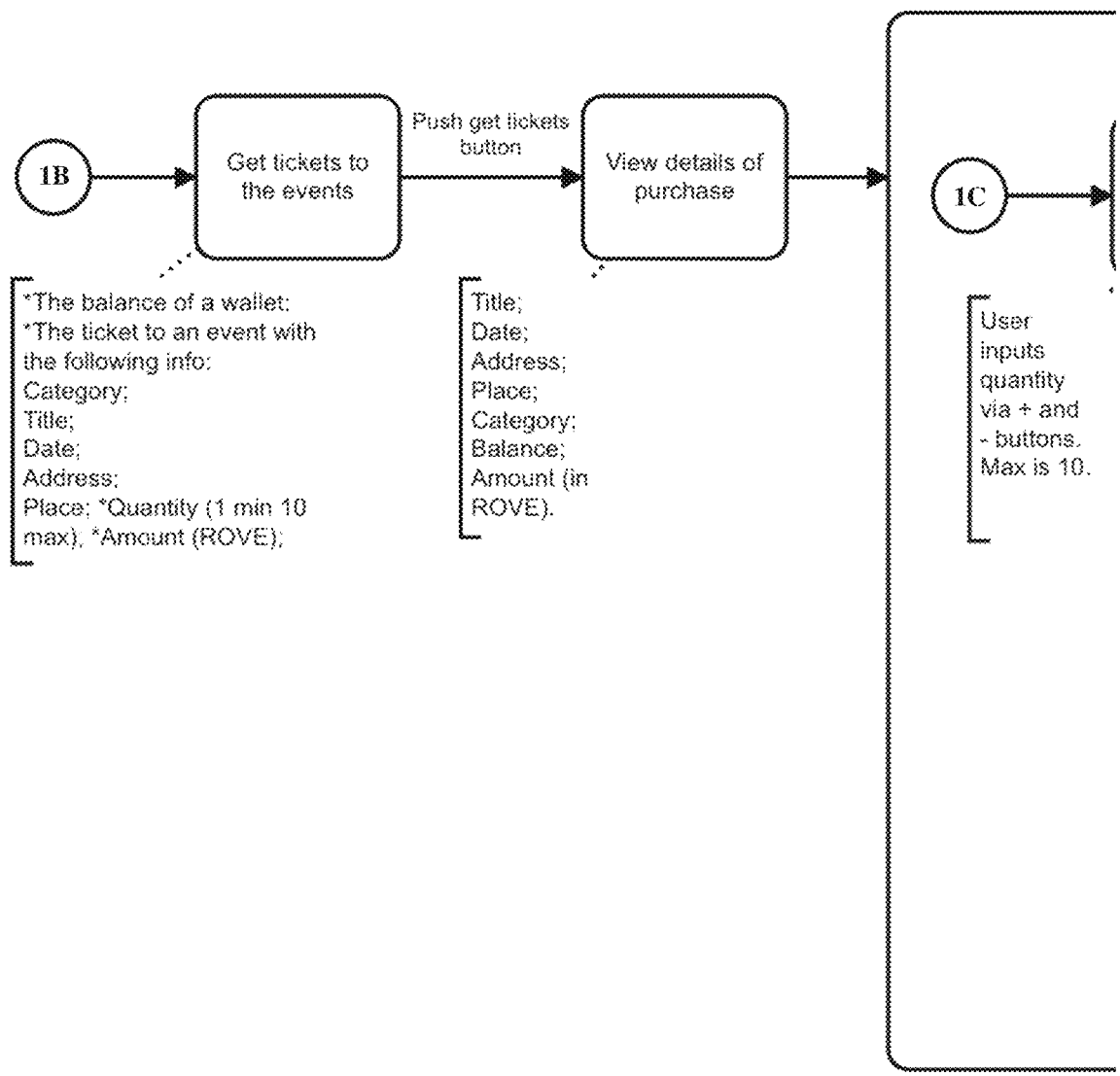
FIG. 1B is a schematic of the ticket purchasing.

FIG. 1B showcases the process for purchasing a ticket. After a user selects 'get tickets', they can view information such as the balance of their wallet, and the ticket with the following information: category, title, date, address, quantity, and the amount in currency. After confirming they would like to get tickets, they can view the details of their purchase. Significant to note is that the maximum number of tickets that can be purchased is 10.

Figure 1C:
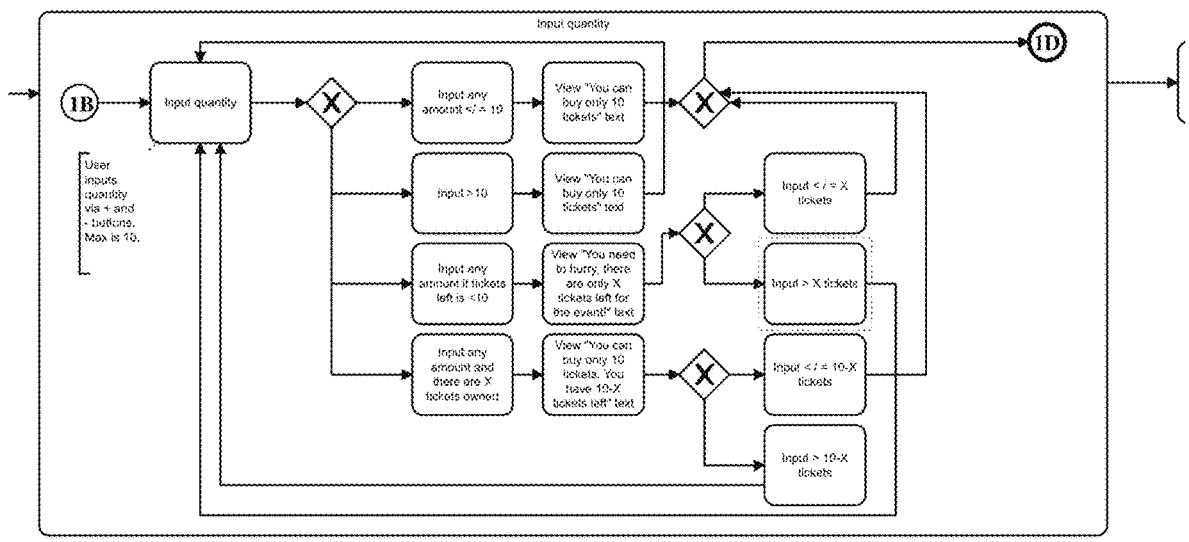
FIG. 1C is an overview of the input variables and quantity.

FIG. 1C is the schematic of the input quantity function of the platform. A user inputs a quantity, any moment equal to 1 or 10 tickets. In the event that a user puts greater than 10 tickets, a warning will inform them that they may only purchase up to 10. If only a select number of tickets are left, for example 10, another warning will pop up to alert the amount left. If a user owns a share of tickets, another warning may pop up to let them know that they have 10-X tickets left.

Figure 1D:
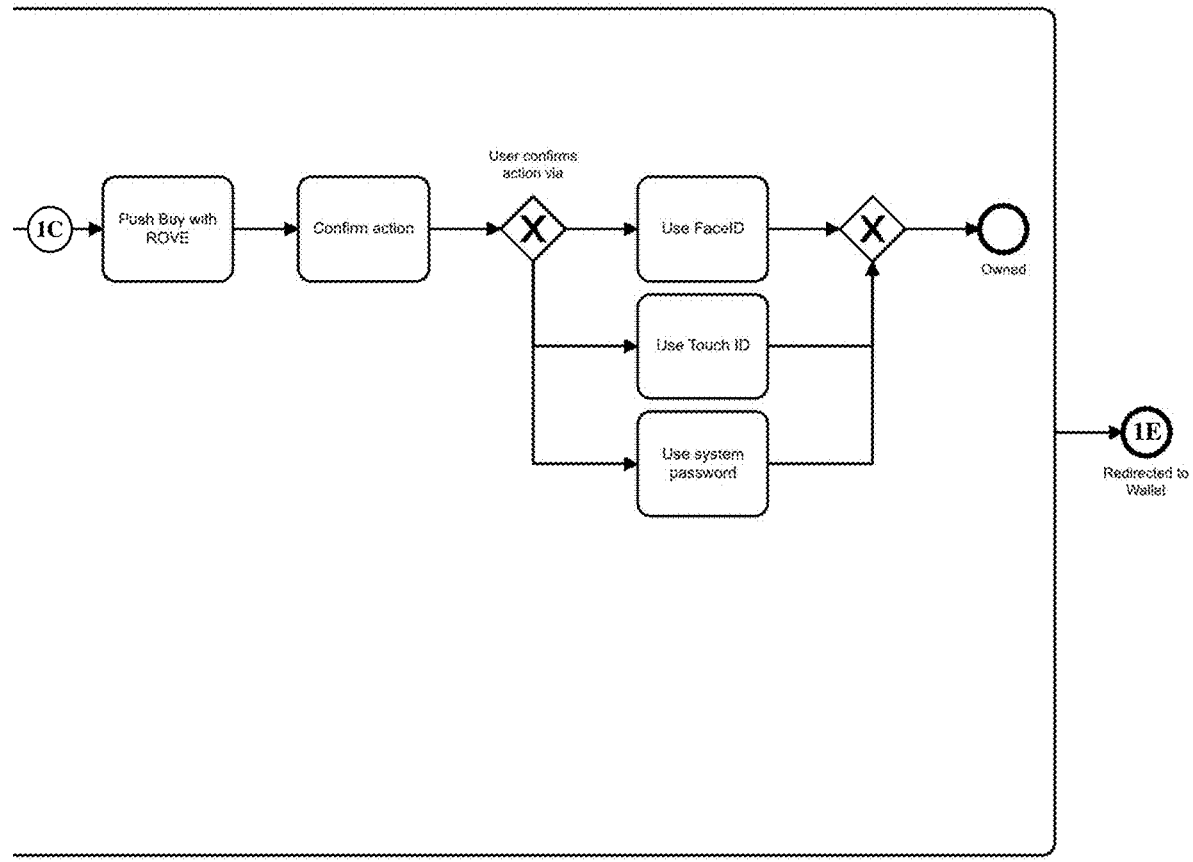
FIG. 1D is the confirmed action after purchasing a ticket which redirects to the wallet.

FIG. 1D is a schematic of the transaction process. Users push buy with the platform, confirm the action, and then validate that action by way of facial or identification, or a system password. Upon completion of the transaction, the digital asset belongs to the user, and they are redirected to their wallet, where the transaction and digital asset is stored.

Figure 1E:
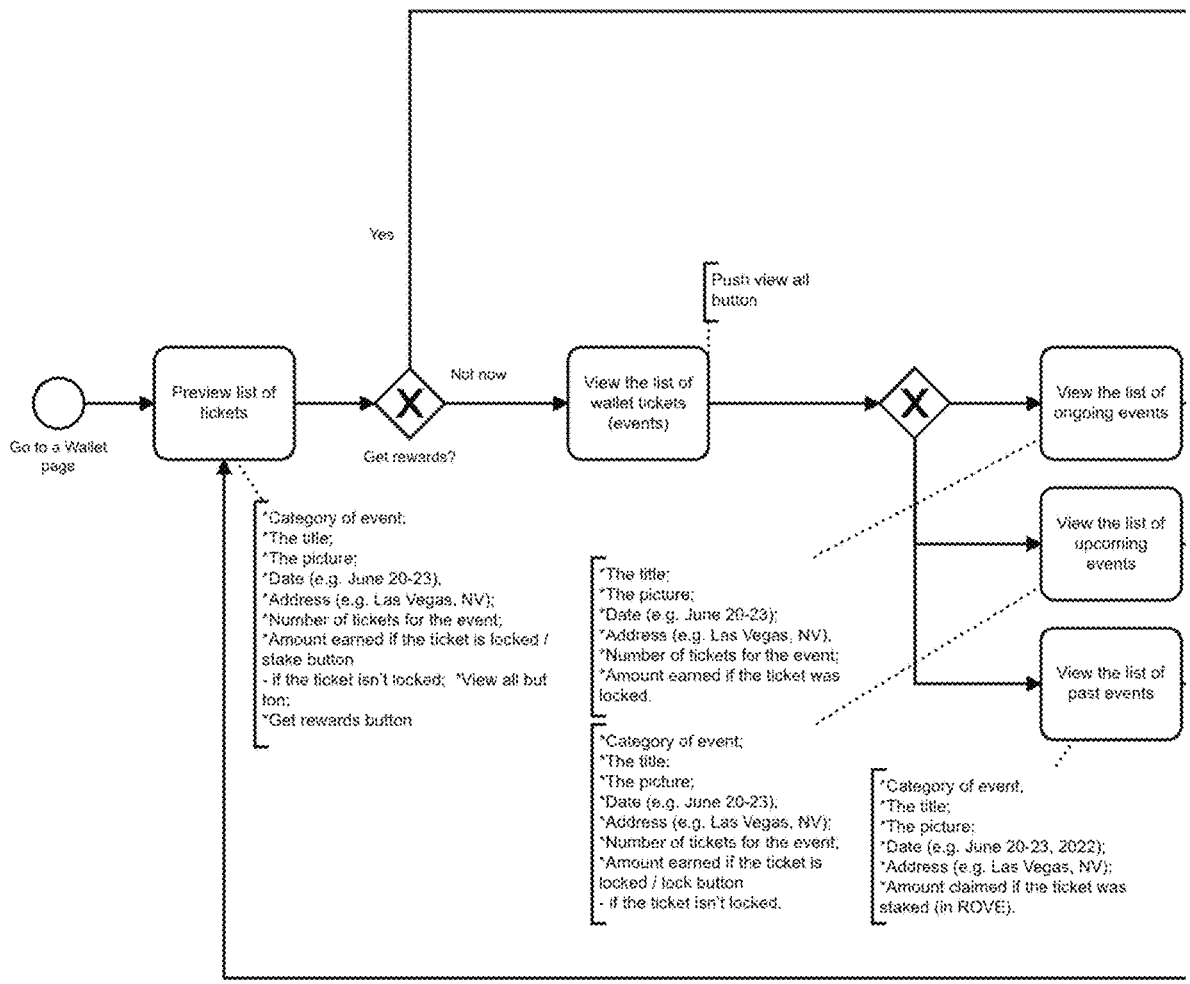
FIG. 1E is the wallet redirection, which previews a list of tickets, past and future events, dates, and addresses.

FIG. 1E is a schematic of the wallet page interactions. A preview list of the tickets is shown, along with the category of the event, the title of the event, a picture, and the date and time of the event. Additionally, it also discloses the number of tickets owned for the event, the amount earned if the ticket is locked or staked alongside a button to stake it if it is not already, and a 'get rewards' button. The 'get rewards' button allows user to get them either now or later. In the instance they don't get them now, they'll be able to view the list of the wallet tickets and events and assess them. A list of ongoing, upcoming, and past events is also displayed.

Figure 1F:
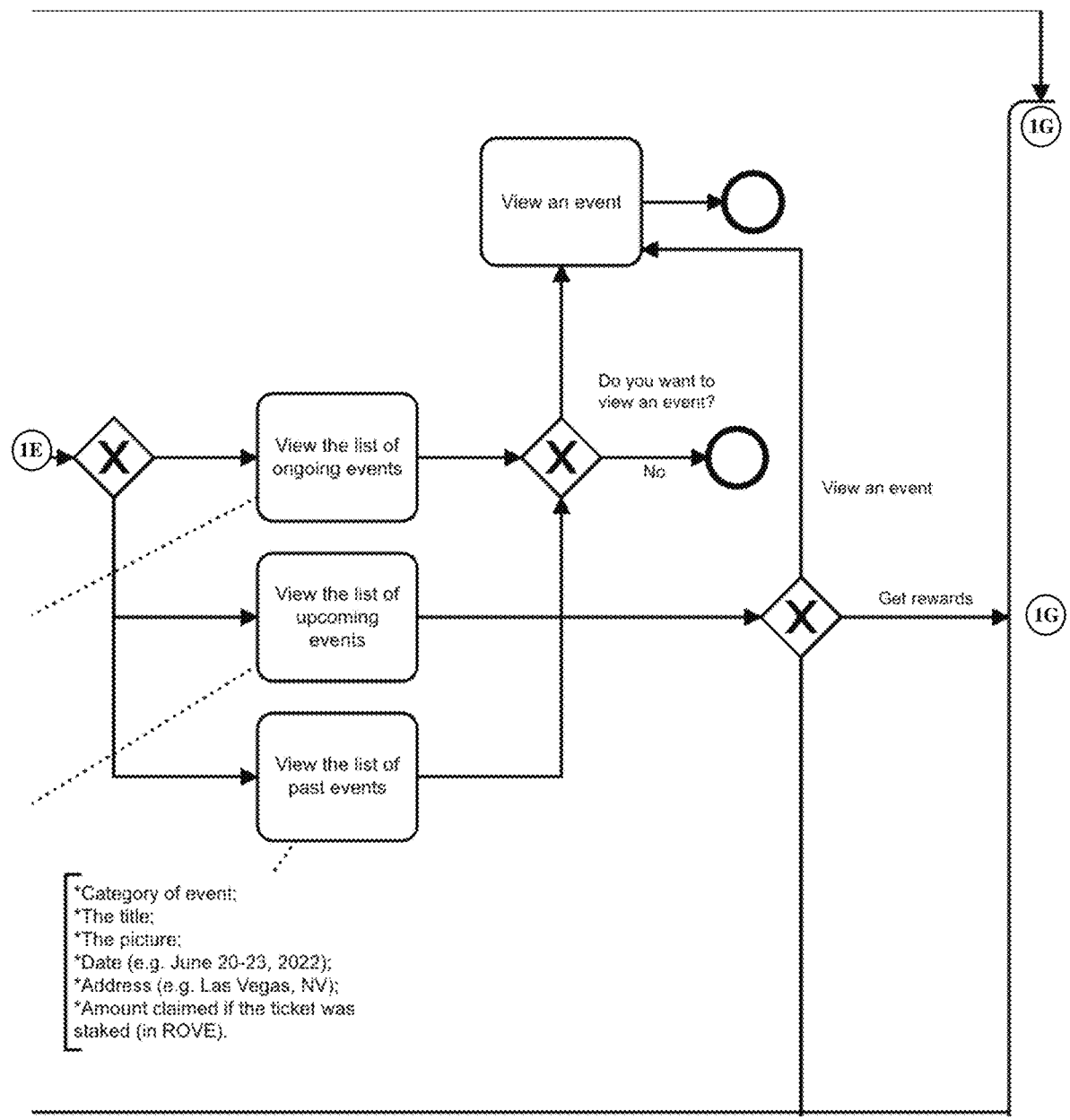
FIG. 1F is a depiction of users viewing an event and getting rewards.

FIG. 1F is a schematic of all ongoing, upcoming, and past events as well as the category of the event, the title of the event, a picture, and the date and time of the event. Additionally, it also discloses the number of tickets owned and the amount staked. If a user elects to get rewards, they are then forwarded to the "get rewards" page 1G.

Figure 1G:
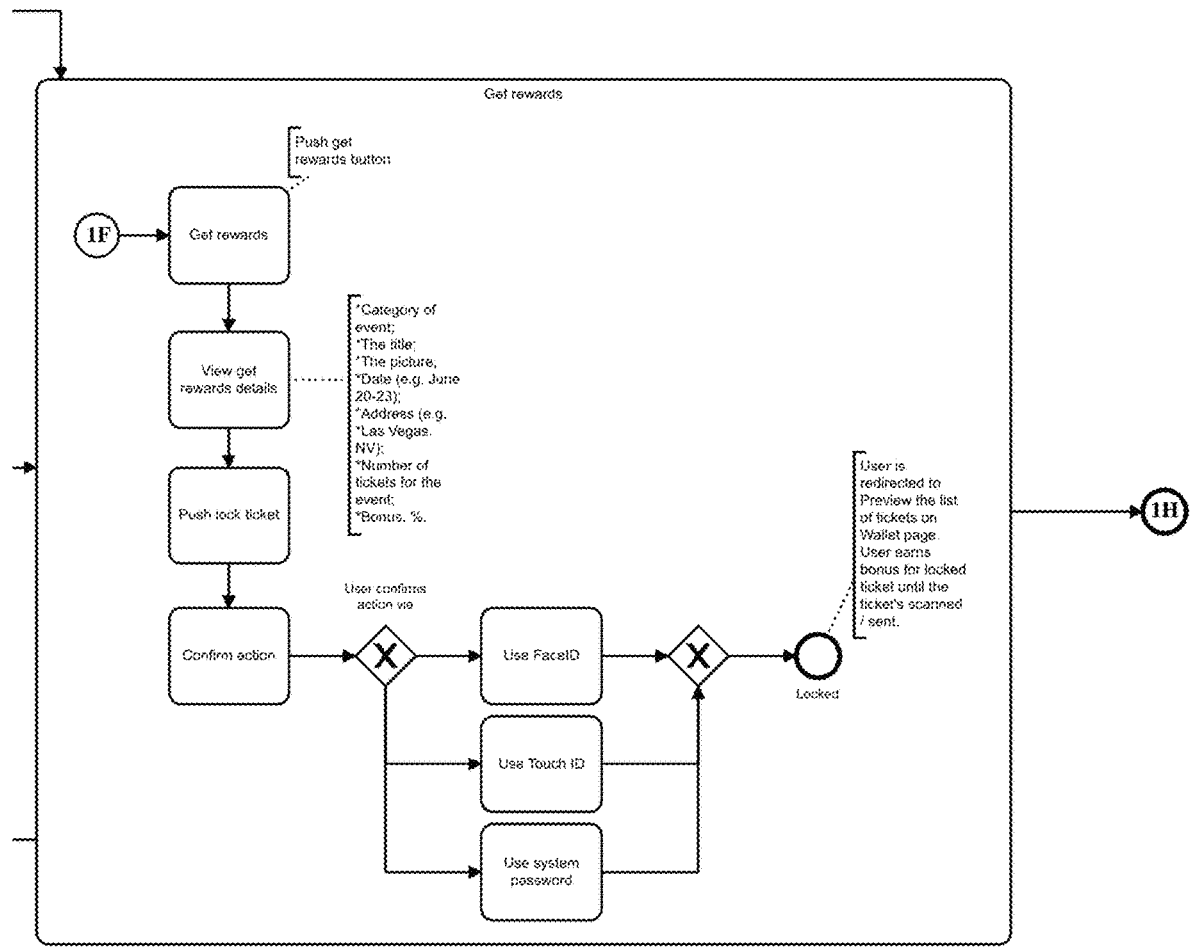
FIG. 1G is a diagram of a user utilizing biometrics in order to purchase and lock tickets for later use, as well as a detailed description of rewards being offered.

FIG. 1G is a schematic of the "get rewards" page, which allows stakers and holders to reap the benefits of their past investments. A user can click 'get rewards', and then view the details regarding their rewards, such as the category of the event, the title of the event, a picture, and the date and time of the event, the number of tickets, and the reward bonus. A user can lock a ticket and then confirm their action using biometrics like face and touch ID, as well as a system password. When the ticket is locked, the user is redirected to preview the list of tickets on the wallet page. The user earns a bonus for their locked ticket until the ticket is scanned and sent.

Figure 1H:
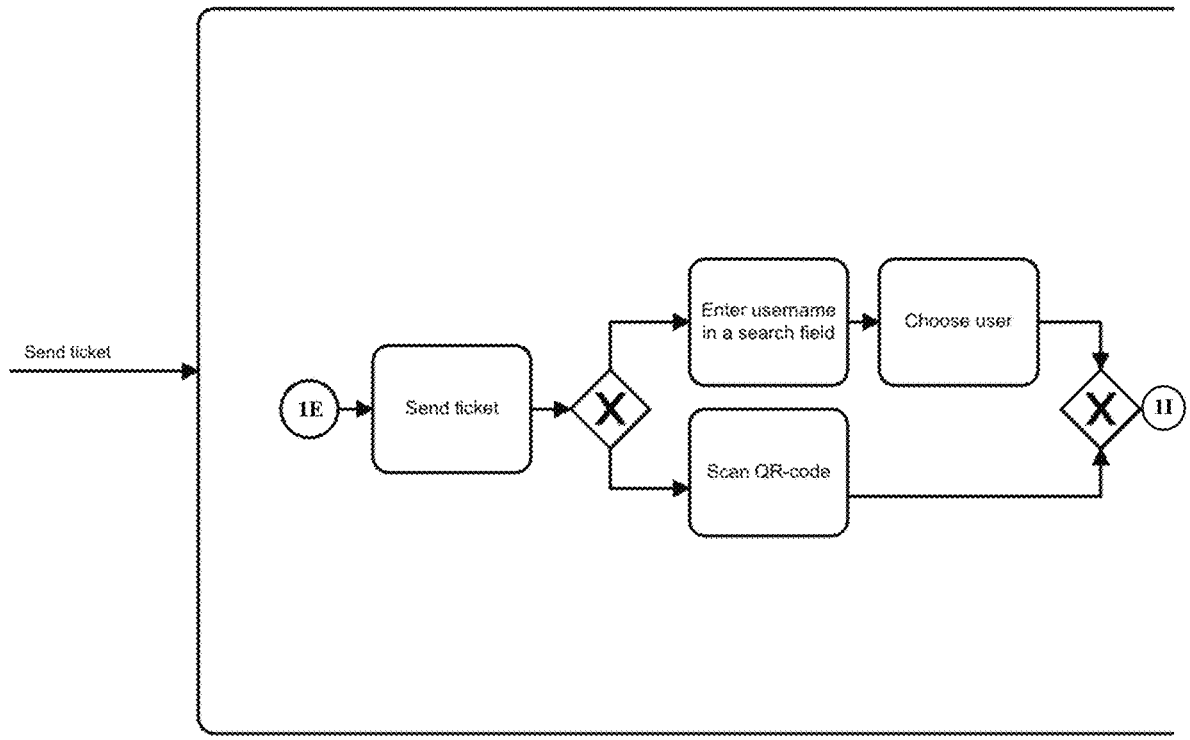
FIG. 1H is an exemplary depiction of how users might transfer tickets to other platform users.

FIG. 1H is a schematic of the "send ticket" page, wherein users can send a ticket to a contact or another user by looking them up in a search field, or by way of QR code. Upon confirmations, users can send tickets.

Figure 1I:
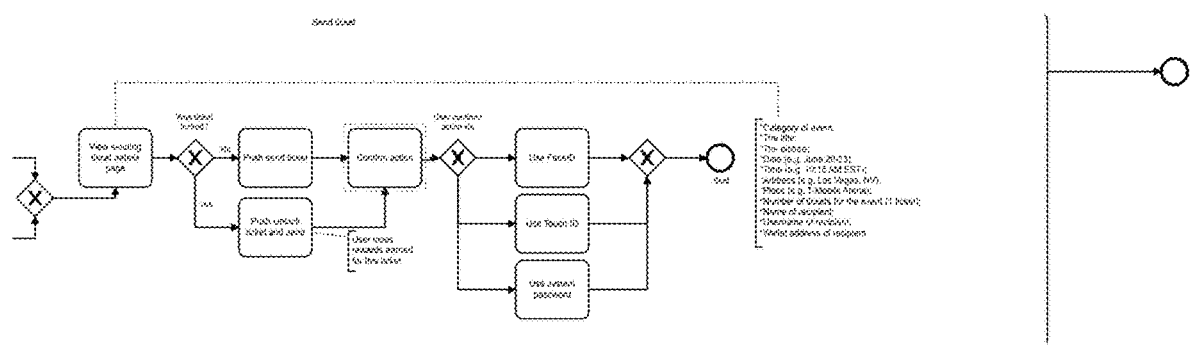
FIG. 1I is a diagram illustrating the details and action confirmations for sending tickets.

FIG. 1I is another schematic of the send ticket function. A user is redirected to a sending ticket details page where they can provide details such as whether a ticket was locked. If not, they can send the ticket and confirm their action, which forfeit the rewards earned for the ticket. Confirmation is executed through biometric validation such as face or touch ID or a system password. If a user's ticket is locked, they may push 'unlock' and send the ticket.

Figure 1J:
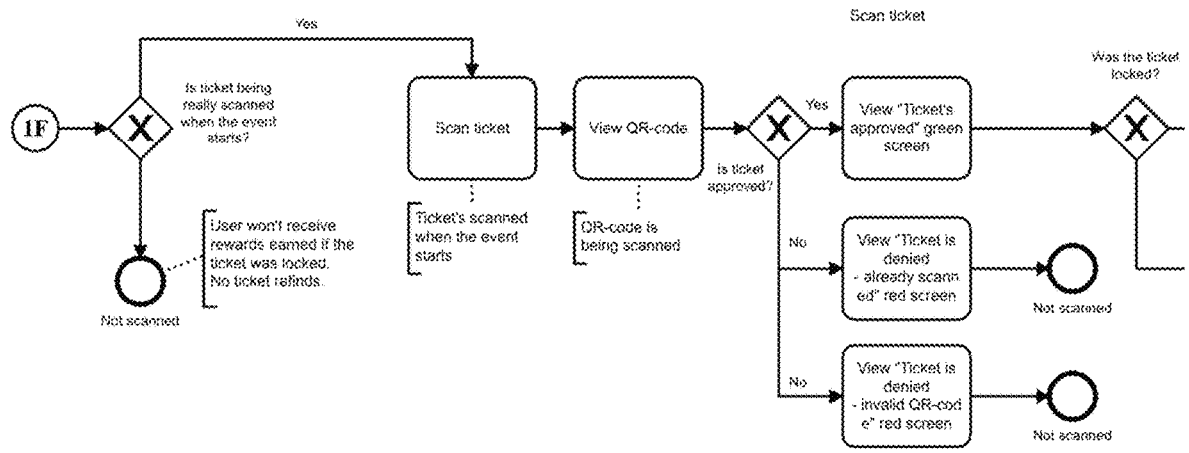
FIG. 1J is an overview of the authentication technology, wherein tickets or QR codes are scanned, and what toggles ticket approval, rejection, and invalidation.

FIG. 1J is an attendance validation schematic. First, the ticket is scanned at the event upon entry. A QR code can also be alternatively scanned. If the ticket is approved, then a screen appears confirming this. If the ticket is not approved, the screen will read, "ticket is denied—already scanned" with a red background. Alternatively, if a ticket is invalid, a screen indicated that the ticket was denied because of an invalid code will appear.

Figure 1K:
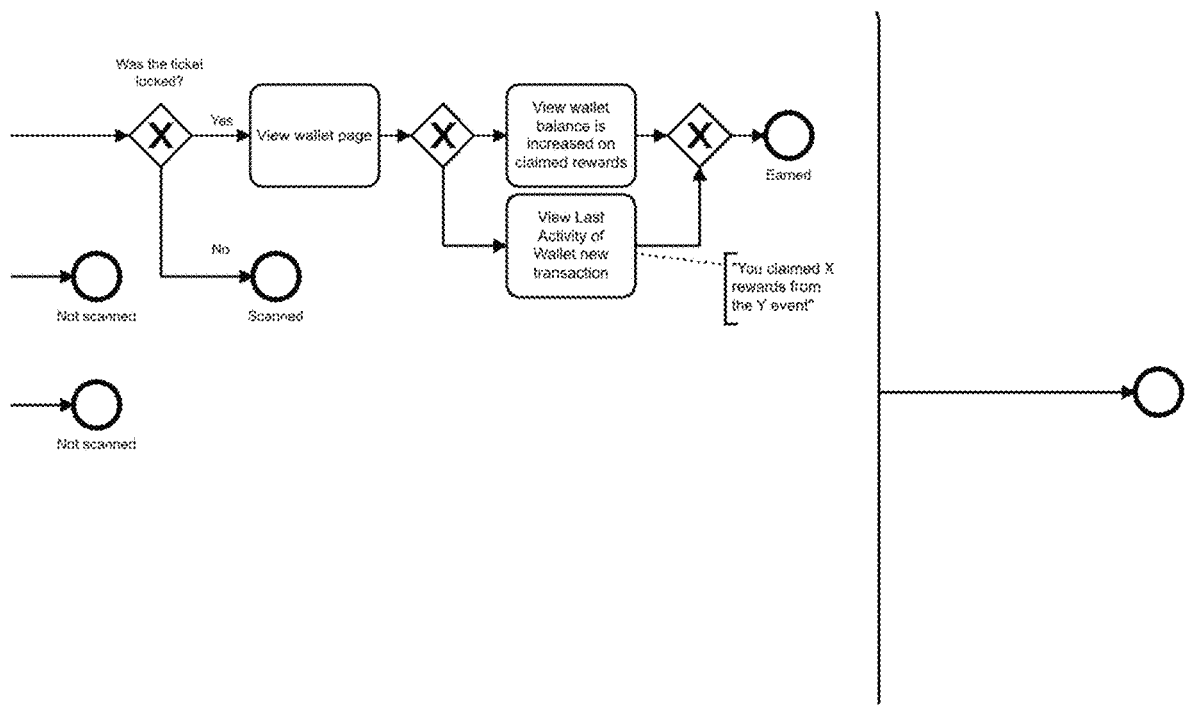
FIG. 1K shows how users are forwarded back to their wallet after locking tickets and provided an activity overview.

FIG. 1K is a confirmation on the status of a ticket. For example, it might ask if the ticket was locked. If the ticket is locked, the user is redirected to the view wallet page. The view wallet page will then display an increased balance for claimed rewards, as well as an activity component for users to view their latest activity or begin a new transaction. One aspect of the invention includes a total sum of rewards claimed, for example, "You claimed X rewards from the Y event".

Figure 1L:
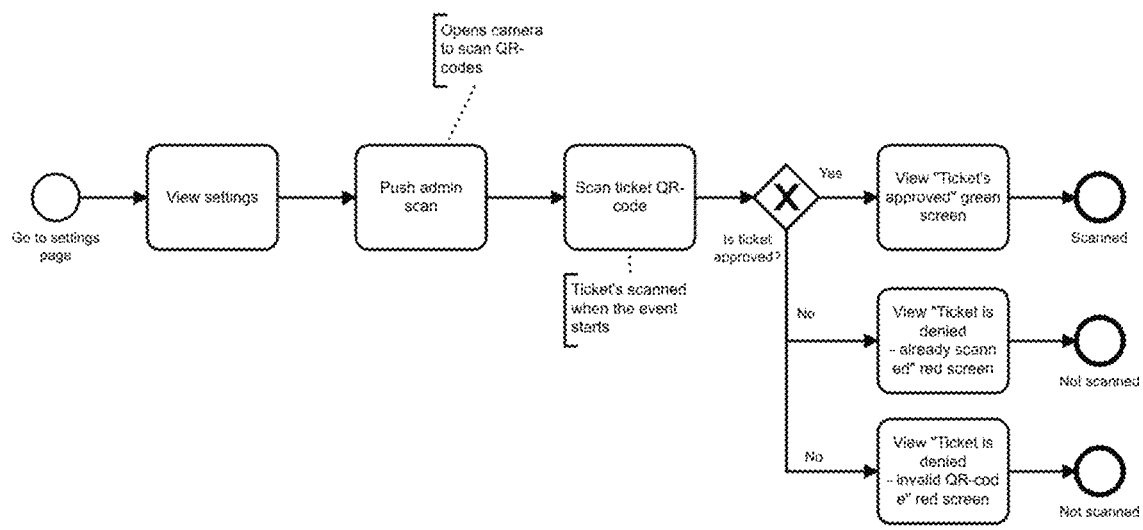
FIG. 1L is a schematic of the settings page and the authentication process for ticket scanning.

FIG. 1L is the ticket administrator interface. An administrator may go to their settings page, view their settings, and push an admin scan. A camera will scan QR codes to entry. When the event starts, the ticket is scanned, and if it's approved a screen will appear indicating its approval. If rejected because it has already been redeemed, the screen will indicate that the "Ticket is denied—already scanned". Only in the first example, wherein the ticket of a staker is approved, can the purchaser qualify for a return on their investment or ticket.

Figure 1M:
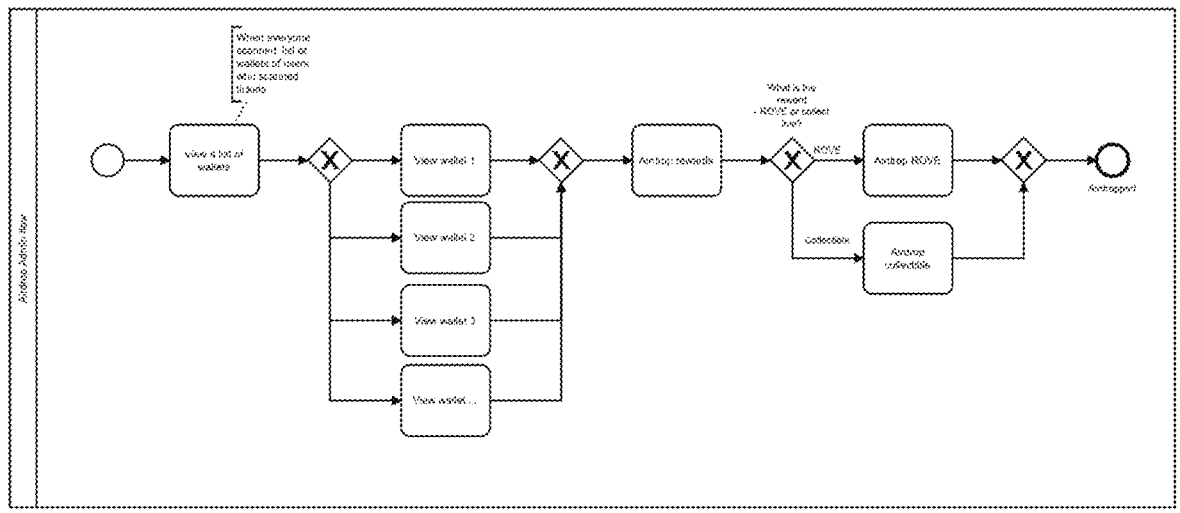
FIG. 1M is the airdrop admin flow, which provides a list of actions and wallets in attendance.

FIG. 1M is a schematic of the present invention's airdropping feature. Users and administrators may view a list of all wallets, or everyone who got scanned into the venue. Then, they can air drop rewards through the network. Users may airdrop collectibles, or platform specific rewards, such as cryptocurrency.

Figure 2:
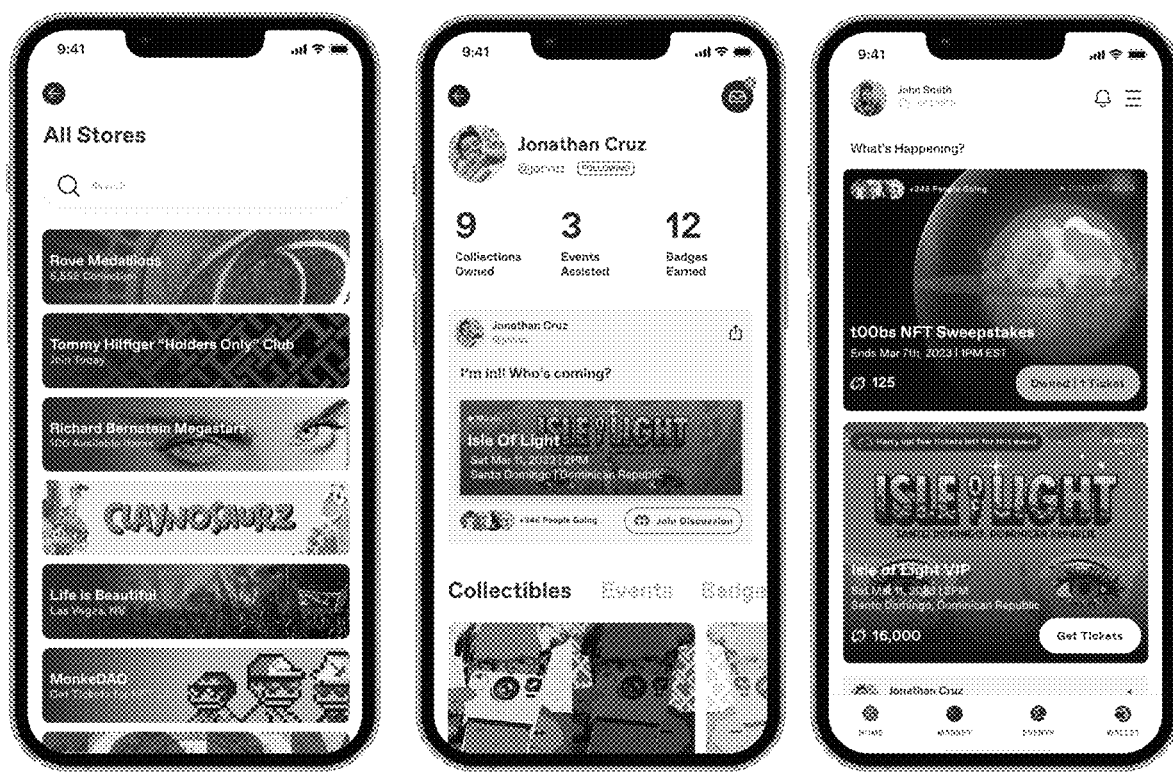
FIG. 2 is an example of the platform's mobile interfaces.

FIG. 2 is an example of the platform's interface. The figure depicts various 'stores' pertaining to events, a user's profile, and the home interface. Users can see a view of their balance when accessing the wallet module, and the options to buy, send, receive, or stake a ticket or digital assets. On the main home page, a user can view current events and interactions among users, a digital market, upcoming events and a wallet. Each event listed discloses how many participants are expected and a 'join discussion' tab wherein users may join to converse about the event using various messaging platforms. Users may also click on a wallet tab which will show their holdings and activity, a calendar tab which will show what dates they've reserved for events, and information such as past, present, and upcoming events. The calendar tab may also be linked to personal calendars, in the instance a user wants a broader overview of their itinerary and schedules. Users will have their own profiles, as seen besides the calendar tab, which can display badges such as their name, event interests, loyalty rewards or ranking, event history, interests, etc.

Figure 3:
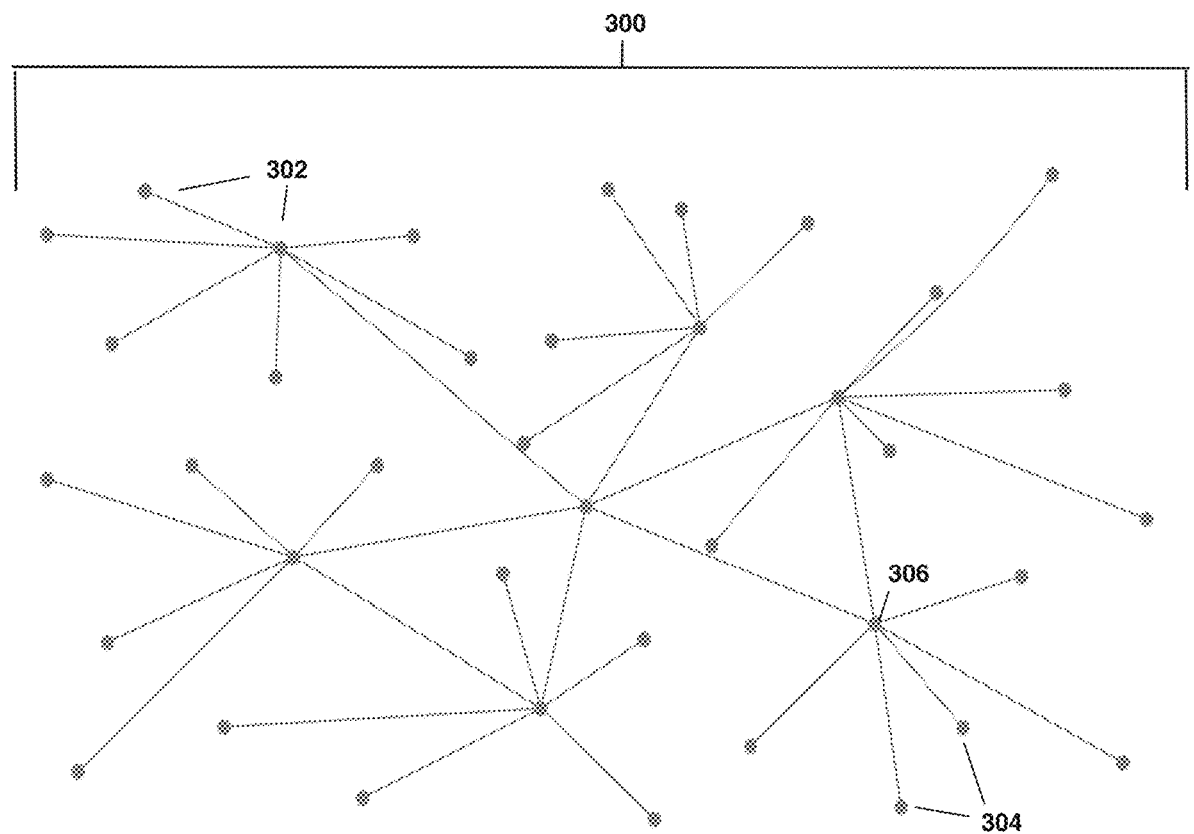
FIG. 3 is a line diagram illustrating a decentralized network.

FIG. 3 is a line diagram illustrating a decentralized network. In accordance with the preferred embodiment of the present invention, the specific architecture of the network can be either decentralized or distributed. FIG. 3, generally represented by the numeral 300, provides an illustrative diagram of the decentralized network. FIG. 3 depicts each node with a dot 302 Under this system, each node is connected to at least one other node 304. Only some nodes are connected to more than one node 306.

Figure 4:
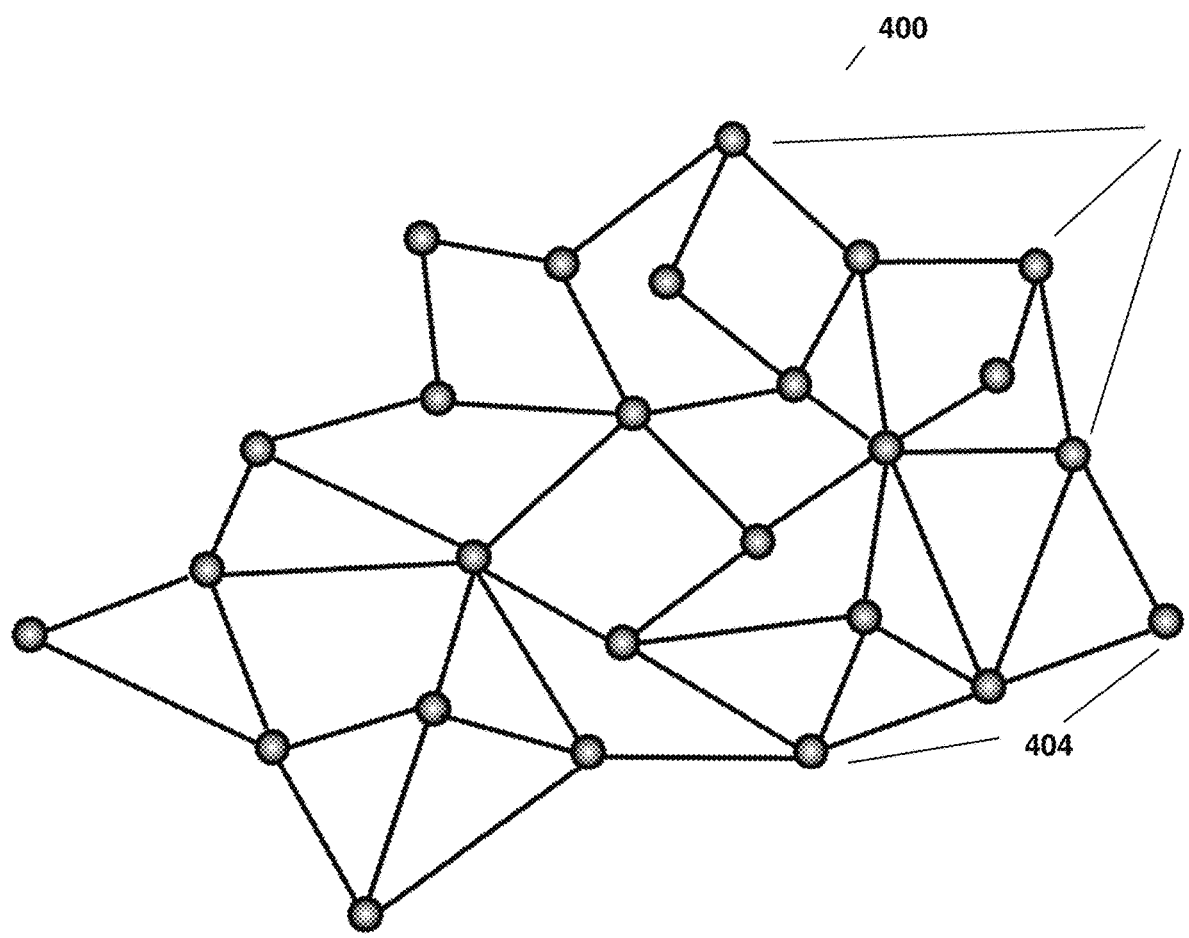
FIG. 4 is a line diagram illustrating a distributed network.

FIG. 4 is a line diagram illustrating a distributed network. For comparison purposes, FIG. 4, which is generally represented by the numeral 400, illustrates a distributed network. Specifically, the illustration shows the interconnection of each node 402 in a distributed decentralized network 400. In accordance with the preferred embodiment of the present invention, each node 402 in the distributed network 400 is directly connected to at least two other nodes 404. This allows each node 402 to transact with at least one other node 402 in the network. The present invention can be deployed on a centralized, decentralized, or distributed network.

In one embodiment, each transaction (or a block of transactions) is incorporated, confirmed, verified, included, or otherwise validated into the blockchain via a consensus protocol. Consensus is a dynamic method of reaching agreement regarding any transaction that occurs in a decentralized system. In one embodiment, a distributed hierarchical registry is provided for device discovery and communication. The distributed hierarchical registry comprises a plurality of registry groups at a first level of the hierarchical registry, each registry group comprising a plurality of registry servers. The plurality of registry servers in a registry group provides services comprising receiving client update information from client devices and responding to client lookup requests from client devices. The plurality of registry servers in each of the plurality of registry groups provide the services using, at least in part, a quorum consensus protocol.

As another example, a method is provided for device discovery and communication using a distributed hierarchical registry. The method comprises broadcasting a request to identify a registry server, receiving a response from a registry server, and sending client update information to the registry server. The registry server is part of a registry group of the distributed hierarchical registry, and the registry group comprises a plurality of registry servers. The registry server updates other registry servers of the registry group with the client update information using, at least in part, a quorum consensus protocol.

Figure 5:
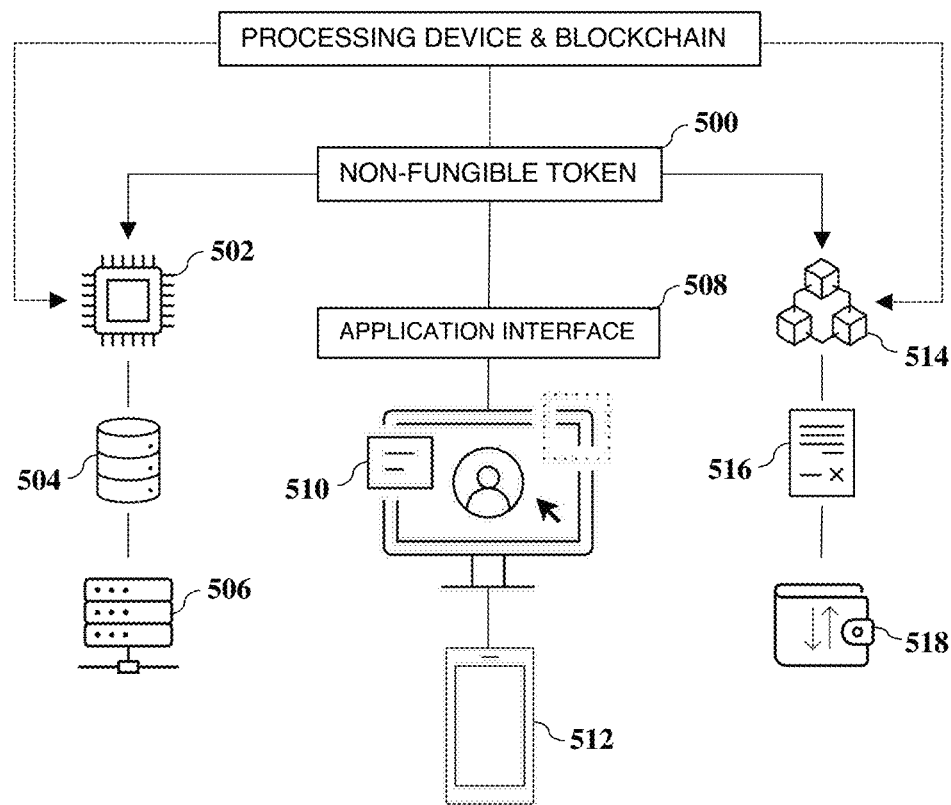
FIG. 5 is a diagram depicting the relationship between processing devices, the blockchain, a non-fungible token and an application interface.

FIG. 5 is a diagram depicting the relationship between processing devices, the blockchain, a non-fungible token 500 and an application interface. The dotted line represents a relationship between a processing device, the blockchain and the non-fungible token which overall encompass all elements disclosed herein. The solid line discloses direct relationships between each linked element. The processing devices comprise of a processor 502 random access memory 504, all of which can interact with and be configured to a network and server 506. The non-fungible token 500 is presented on an application interface 508. The aforementioned elements help generate the application interface 508 for the platform 510 on, by way of example and not limitation, a compact personal device such as a mobile phone 512. The non-fungible token 500 operates on a blockchain ledger 514 which comprises of elements such as smart contracts 516 and a digital wallet 518.

Figure 6:
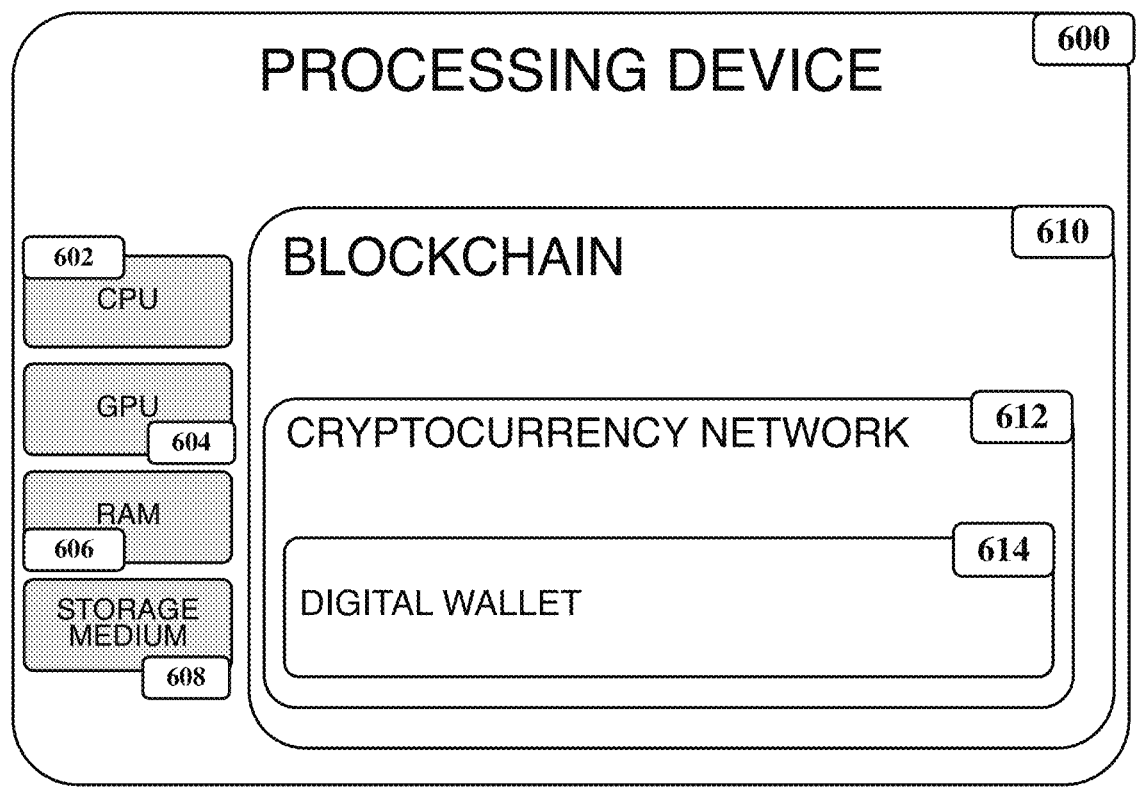
FIG. 6 is a shell diagram showcasing each component of each technological element in the present invention.

FIG. 6 is a shell diagram showcasing each component of each technological element in the present invention. A processing device 600 is the setting for the blockchain 610, cryptocurrency network 612 and digital wallet 614 which has public and private keys for transactions. The processing device has a central processing unit 602, a graphics processing unit 604, random access memory 606, and a storage medium 608 which may be transitory or non-transitory.

Figure 7:
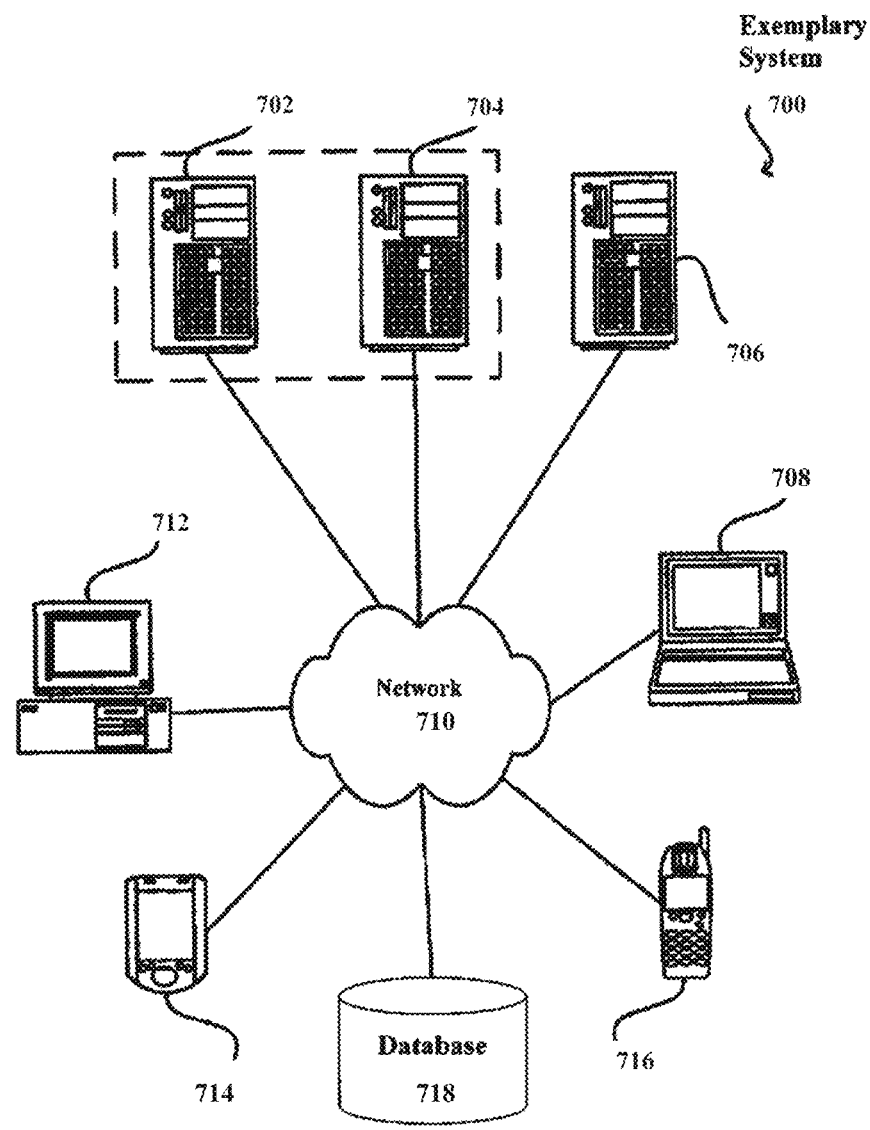
FIG. 7 is an illustration depicting an exemplary operating environment including one or more user computers, computing devices, or processing devices, which can be used to operate a client, such as a dedicated application, web browser is shown.

FIG. 7 is a diagram showing the web services of the platform and system. The platform and system are all components of an exemplary operating environment in which embodiments of the present invention may be implemented. The system can include one or more user computers, computing devices, or processing devices which can be used to operate a client, such as a dedicated application, web browser, etc. The user computers 708, 712 can be general purpose personal computers 708, 712 (including, merely by way of example, personal computers and/or laptop computers running a standard operating system), cell phones or PDAs 714, 716, (running mobile software and being Internet, e-mail, SMS, Blackberry, or other communication protocol enabled), and/or workstation, computers running any of a variety of commercially-available UNIX or UNIX-like operating systems (including without limitation, the variety of GNU/Linux operating systems). These user computers may also have any of a variety of applications, including one or more development systems, database client and/or server applications, and Web browser applications. Alternatively, the user computers may be any other electronic device, such as a thin-client computer, Internet-enabled gaming system, and/or personal messaging device, capable of communicating via a network 710 (e.g., the network described below) and/or displaying and navigating Web pages or other types of electronic documents. Although the exemplary system is shown with four user computers, any number of user computers may be supported.

In most embodiments, the system includes some type of network 710. The network 710 can be any type of network 710 familiar to those skilled in the art that can support data communications using any of a variety of commercially-available protocols, including without limitation TCP/IP, SNA, IPX, AppleTalk, and the like. Merely by way of example, the network can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, WiMAX, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers may be dedicated to running applications, such as a business application, a Web server, application server, etc. Such servers may be used to process requests from user computers. The applications can also include any number of applications for controlling access to resources of the servers.

The Web server can be running an operating system 700 including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers. As one example, a server may execute one or more Web applications. The Web application may be implemented as one or more scripts or programs written in any programming language, such as Java®, C, C #, or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer.

End users, or users that are viewing and using the network platform, all contribute data to the cloud. A web service platform helps secure that data and maintain the service's functionalities. Only authorized users and entities can authorize or unauthorize content and monitor data stored within the web service. The platform's web services help maintain the operations of elements managed by the storage system.

The system may also include one or more databases 720. The database(s) may reside in a variety of locations. By way of example, a database 718 may reside on a storage medium local to (and/or resident in) one or more of the computers. Alternatively, it may be remote from any or all of the computers, and/or in communication (e.g., via the network) with one or more of these. In a particular set of embodiments, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, such as Oracle 10g, that is adapted to store, update, and retrieve data in response to SQL-formatted commands.

Figure 8:
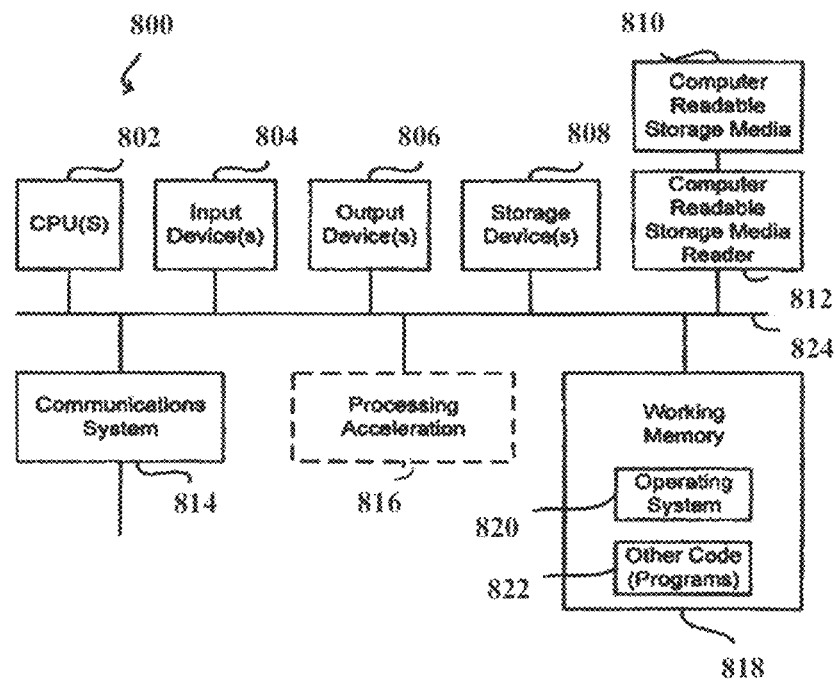
FIG. 8 is another illustration depicting an exemplary operating environment including a computer system with various elements as shown.

FIG. 8 illustrates an exemplary computer system, in which embodiments of the present invention may be implemented. The system 800 may be used to implement any of the computer systems described above. The computer system 800 is shown comprising hardware elements that may be electrically coupled via a bus. The hardware elements may include one or more central processing units 802 (CPUs), one or more input devices 804 (e.g., a mouse, a keyboard, etc.), and one or more output devices 806 (e.g., a display device, a printer, etc.). The computer system 800 may also include one or more storage devices 808. By way of example, the storage device(s) can include devices such as disk drives, optical storage devices, solid-state storage device such as a random access memory ("RAM") and/or a read-only memory ("ROM"), which can be programmable, flash-updateable and/or the like, as well as non-transitory and transitory storage mediums.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system may also include a processing acceleration unit 816, which can include a digital signal processor DSP, a special-purpose processor, and/or the like.

The computer-readable storage media reader 812 can further be connected to a computer-readable storage medium, together (and, optionally, in combination with storage device(s)) comprehensively representing remote, local, fixed, and/or removable storage devices plus storage media for temporarily and/or more permanently containing, storing, transmitting, and retrieving computer-readable information. The communications system may permit data to be exchanged with the network and/or any other computer described above with respect to the system.

The computer system may also comprise software elements, shown as being currently located within a working memory, including an operating system 820 and/or other code 822, such as an application program (which may be a client application, Web browser, mid-tier application, RDBMS, etc.). It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media 810 for containing code 822, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 8 further illustrates an environment where an on-demand distributed database service might be used. As illustrated in FIG. 8 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users access the on-demand database service via user systems, or third party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or another appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement, each user system and all its components are operator configurable using applications, such as a browser, including computer code run using a central processing unit such as an Intel Pentium® processor or the like. Similarly, a computer system (and additional instances of an enterprise database, where more than one is present) and all their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

Figure 9:
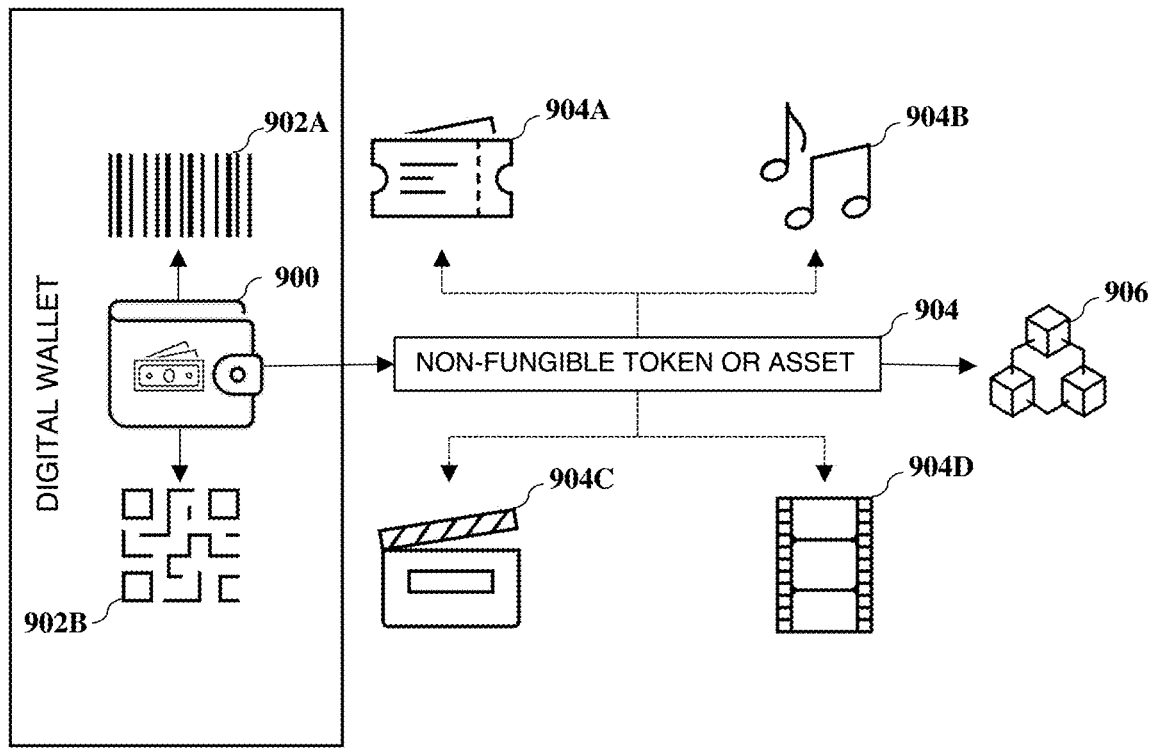
FIG. 9 are examples of non-fungible tokens considered to be digital assets in a user's wallet.

FIG. 9 are examples of non-fungible tokens considered to be digital assets in a user's digital wallet. The digital wallet 900 features an identification code, or blockchain ID 902A and a QR code 902B which may be scanned for access and authorization from personnel. The digital wallet 900 holds a non-fungible token or asset 904 which can be a digital ticket 904A, music 904B including exclusive song drops to super fans, behind the scenes and production content 904C and/or music video footage 904D. The non-fungible token is stored on an immutable ledger, the blockchain 906, which provides a history of all transactions and trades of the token. While the digital wallet 900 may also store cryptocurrency, it is not necessary for a user to deposit or use cryptocurrency directly to utilize their wallets, as it may be operated through the back end.

Figure 10:
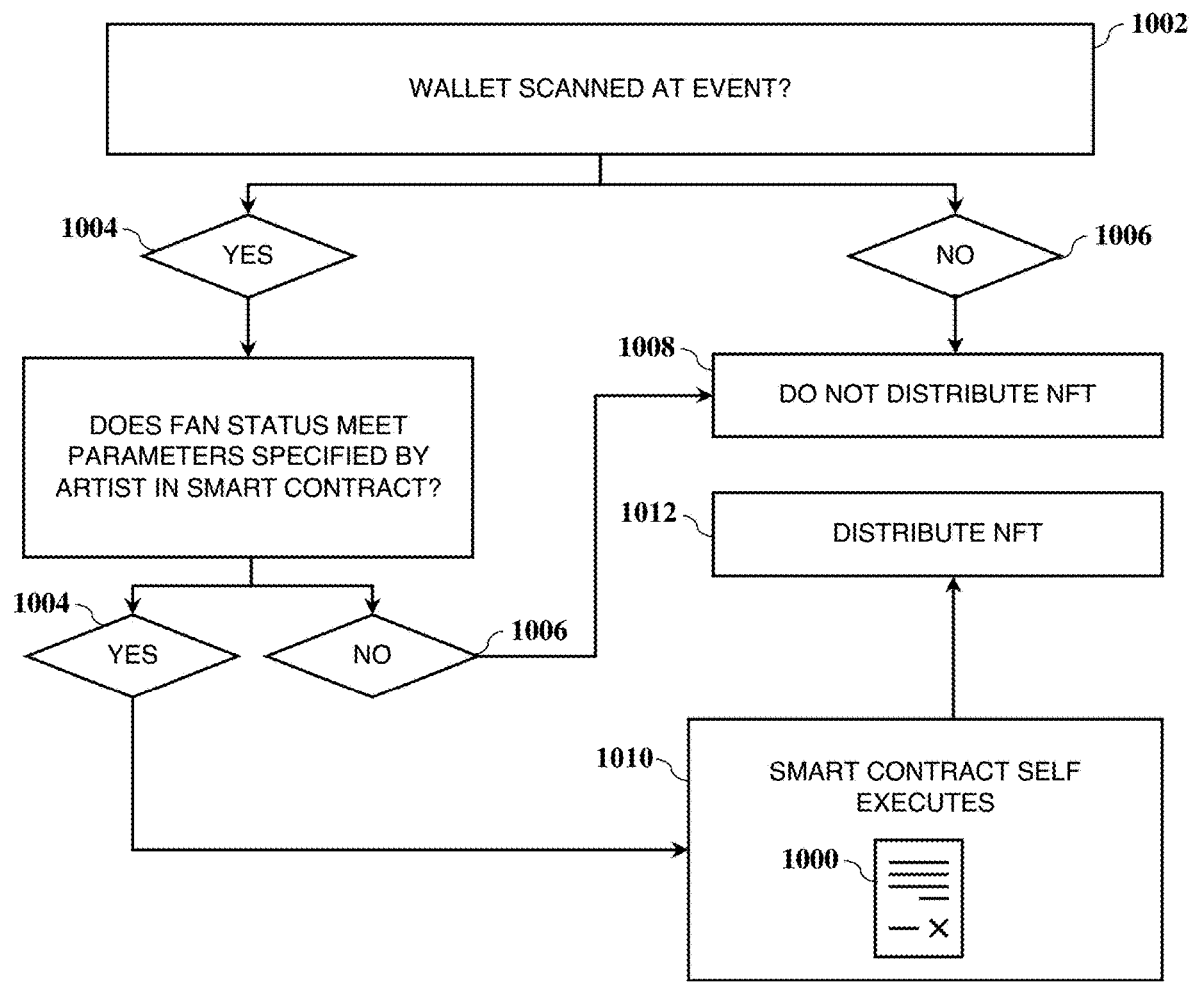
FIG. 10 is a depiction of a smart contract's execution protocol.

FIG. 10 is a depiction of a smart contract's execution protocol. The smart contract 1000 may employ a set of coding protocols that, if true, proceed on to a next series of questions based off available data from the blockchain's ledger. For example, if a digital wallet has been scanned at an event 1002 the immutable ledger will reflect that and determine YES 1004 or NO 1006. In this example, "NO" does not distribute an NFT 1008. If yes, further terms may be prompted such as whether the fan meets the parameters specified by the artist in a smart contract, such as a minimum number of concert visits, event invites, or non-fungible tokens. "YES" prompts the self-execution 1010 of a smart contract 1000 and allows the NFT to be distributed 1012 in the attendee's digital wallet. An event may be triggered based off whether a smart contract 1000 term has been met.

Figure 11:
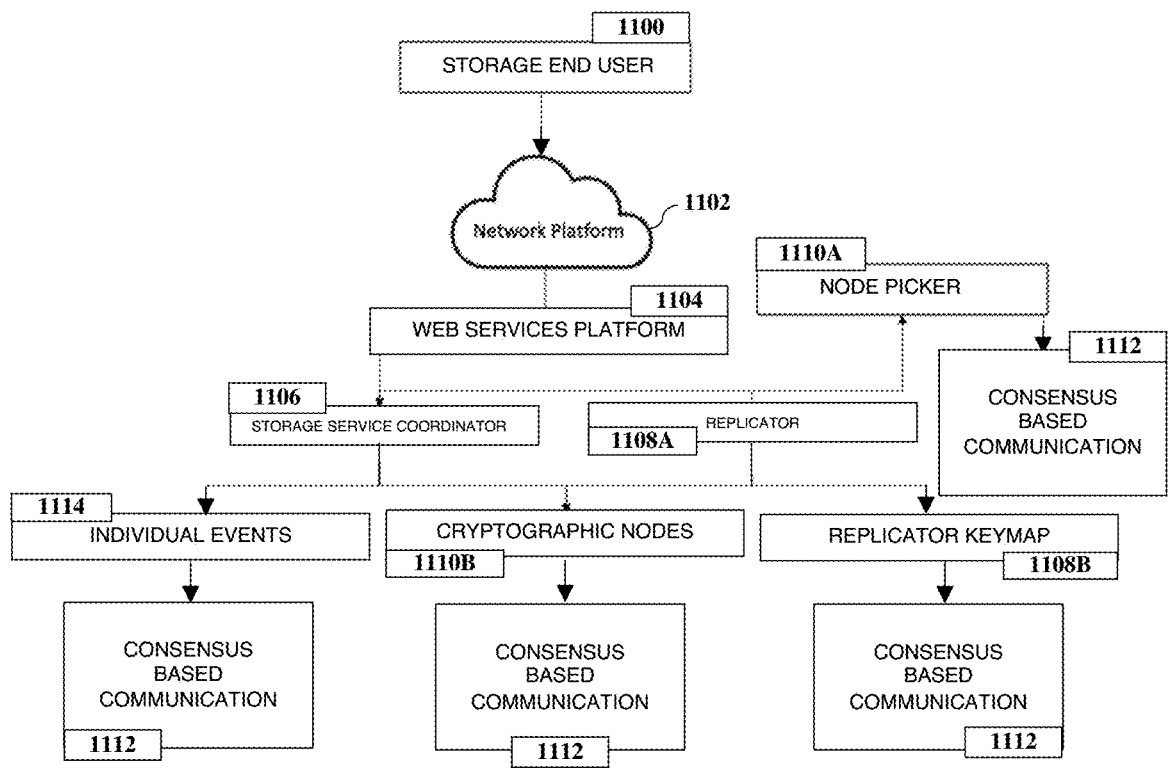
FIG. 11 is a diagram depicting the platform's web service infrastructure.

FIG. 11 is a diagram showing the communication between the storage end users 1100, the network platform 1102 and the various elements that help effectuate operations. The storage end user 1100 communicates and relays various pertinent bits of data to the network platform 1102. The network platform operates 1102 on the web service platform 1104, which features a storage service coordinator 1106 and replicator 1108. Each of these services utilize a node picker 1110A which helps establish consensus-based communication 1112. The storage service coordinator maintains and records individual events and cryptographic nodes 1110B, or keys that are used for operations. The replicator 1108A has its own keymap 1108B which generates consensus-based communication 1112, alongside the cryptographic nodes 1110B and individual events 1114.

Figure 12:
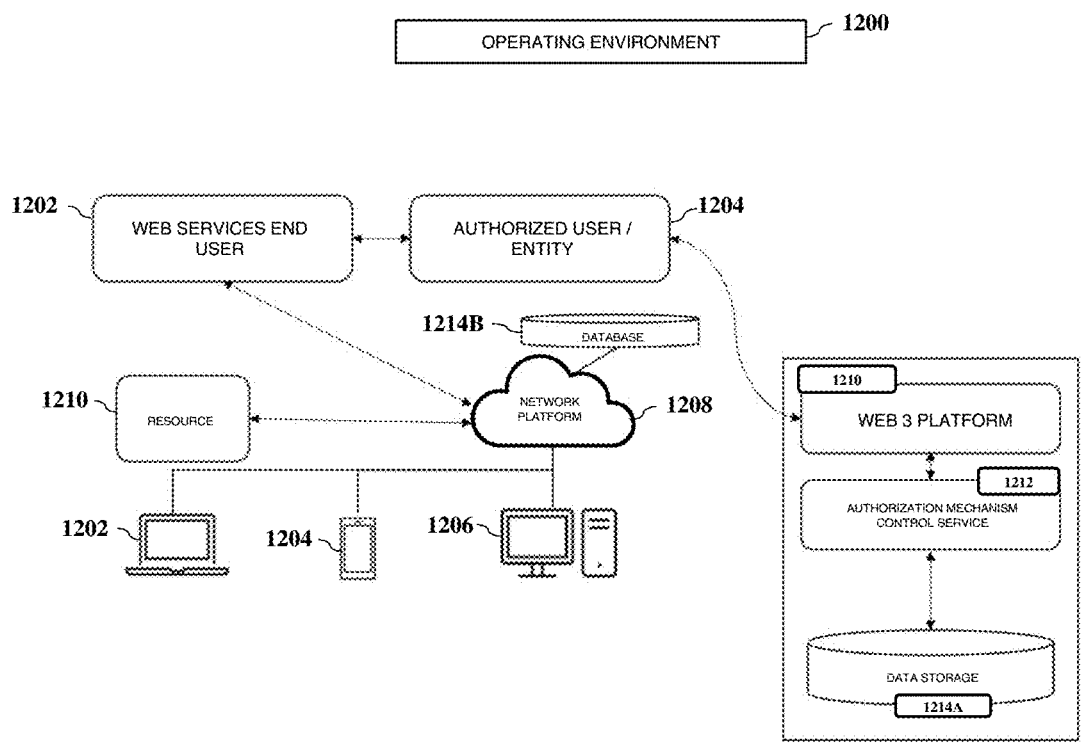
FIG. 12 is a depiction of the platform's web services, as well as the components of an exemplary operating environment in which embodiments of the present invention may be implemented.

FIG. 12 is a diagram showing the web services of the platform and system. The platform and system are all components of an exemplary operating environment 1200 in which embodiments of the present invention may be implemented on the blockchain. A web service end user 1202 is given authorized access to the web 3 platform 1204 which stores all data pertinent to their transactions and digital tickets in a data storage unit 1214 that may be cloud based through the network or locally stored. The web service end user 1202 operates on the blockchain network platform 1208 which is connected to processing devices such as a computing device 1202, a mobile device 1202, or any other type of personal computer that has access to a server and features a central and graphics processing unit 1206. The network platform operates on a resource 1210, such as a hardware or software resource.

Figure 13:
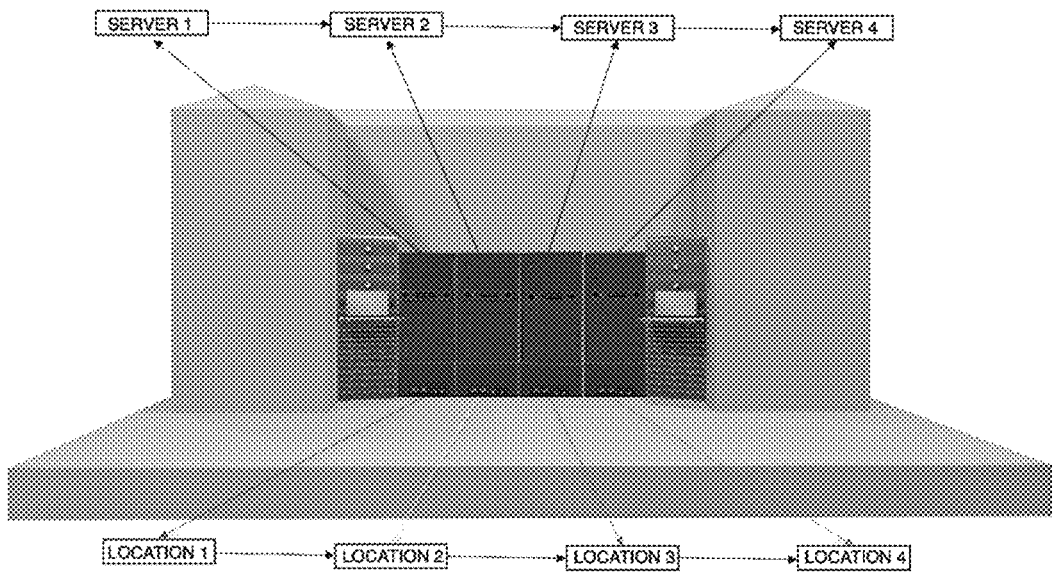
FIG. 13 is an illustration of a multi-server room and the various locations in which other pertinent server rooms may exist.

FIG. 13 is an illustration of server-to-server connections, within a server room and to other sever room locations. The web server undergoes an initialization process and features a database of wireless network data. Dependent on the service requested, the data may undergo processing. The servers actively attempt to retrieve the appropriate data to provide user input. Data may then be formatted, and with the appropriate authorizations, saved or restructured.

Figure 14:
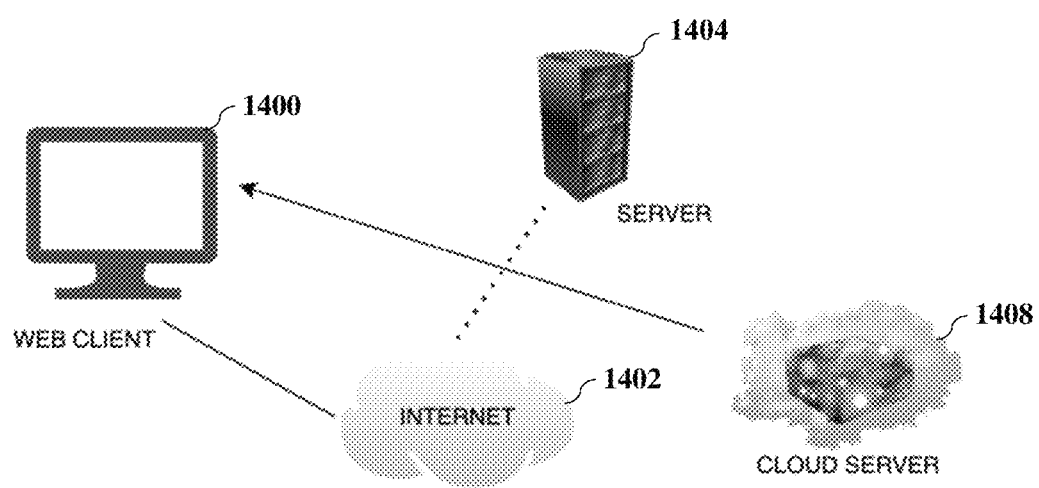
FIG. 14 is a diagram outlining the web services incorporated with server-client communication.

FIG. 14 is a diagram outlining the role of web services in the present invention. In accordance with the preferred embodiment, a web client 1400 interacts with the server ecosystem by way of a service connection, such as the internet 1402, which then distributes data and pertinent operations such as the presentation of a web service platform data to servers 1404 which may be physical server room or cloud-based servers 1408 located in aforementioned memory units. This allows for data to be streamlined between the client and the server as well as cloud servers and other database systems. Communication between web services may be completed via Simple Object Access Protocol (SOAP) which allows multiple web service applications to communicate rapidly and efficiently and to provide data to the web client.

The infrastructure of the present invention also allows for the use of web services that enable interaction with and storage of data across devices. Specifically, these web services can allow for the use of cloud software tools and cloud-based data storage. Cloud software tools can be used to allow for increased user authentication and authorization checkpoints for data accessed between parties. The web service software aids in the transmission of data between entities while still maintaining secure access restrictions preventing any unauthorized access to the cloud data.

Figure 15:
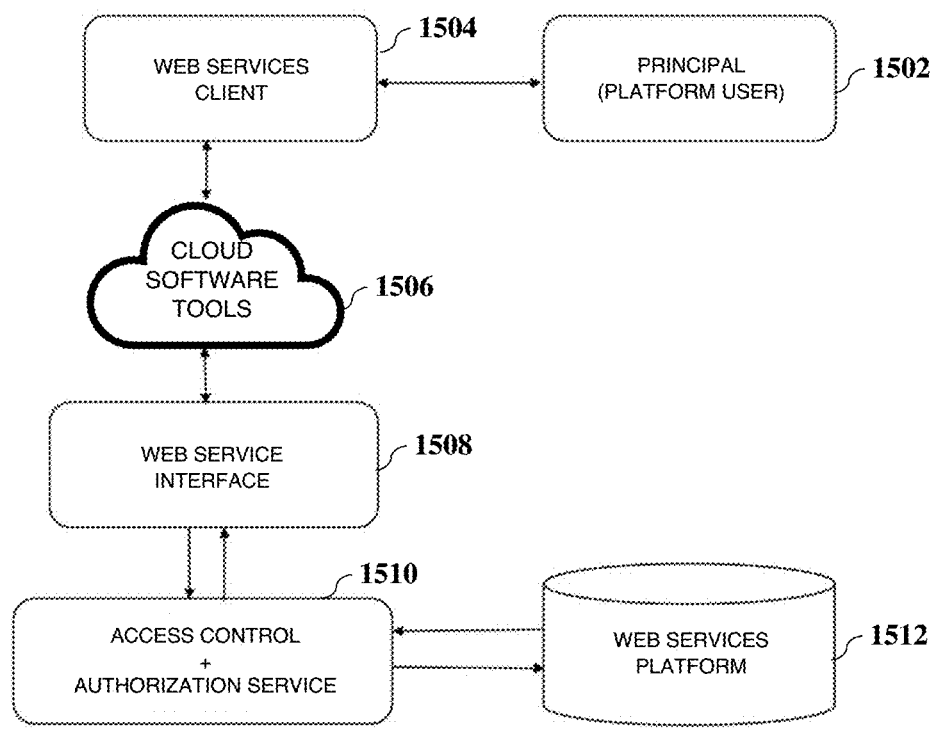
FIG. 15 is a diagram of the flow of access between the platform of the present invention and the web services client via cloud software tools.

FIG. 15 is a diagram of the flow of access between the platform of the present invention and the web services client via cloud software tools. The principal or platform user 1503 accesses the web services client 1504, which then transmits data via cloud software tools 1506 to the web services interface. Access control and authorization 1510 acts as a layer in order to access the web services platform 1512 by way of the web services interface 1508.

Figure 16:
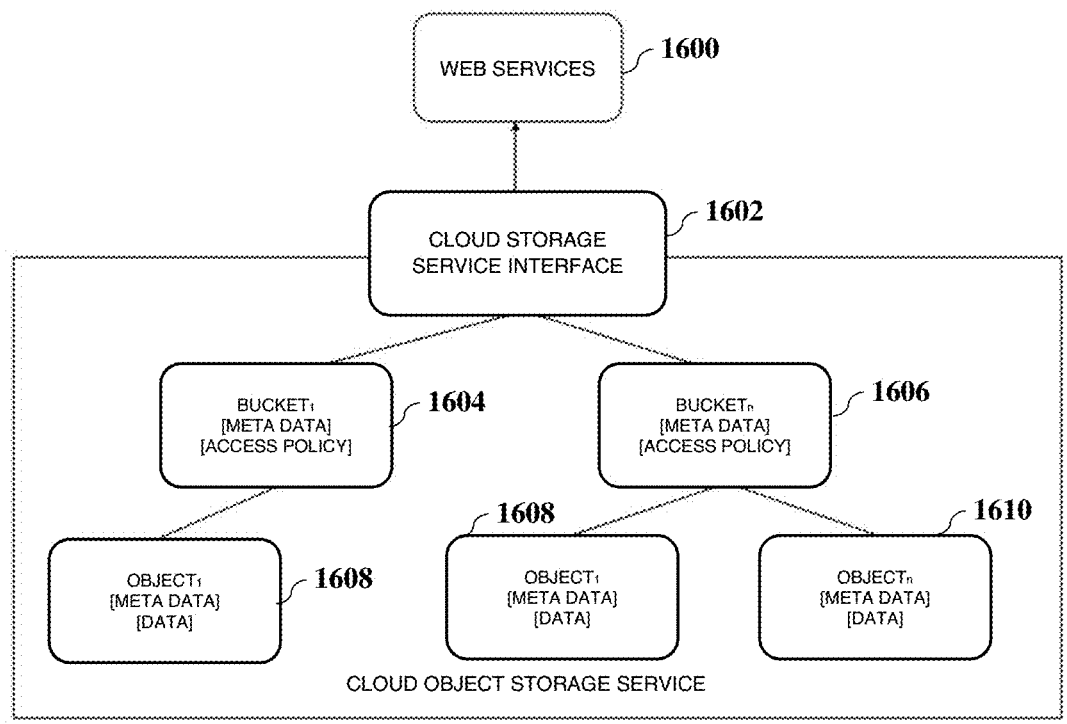
FIG. 16 is a diagram of an example of the cloud storage organization in which the web services accesses and retrieves user data as objects in buckets within a cloud storage space.

FIG. 16 is a diagram of an example of the cloud storage organization in which the web services 1600 accesses and retrieves user data as objects in buckets within a cloud storage space 1602. The cloud storage service is a means of storing and protecting any amount of data for a range of use cases. A bucket, as exemplified through 1604 and 1606, is a container for objects stored in the cloud storage service, and objects consist of object data and metadata, as exemplified by 1608 and 1610. The metadata is a set of name-value pairs that describe the object. These pairs include some default metadata, such as the date last modified, and standard HTTP metadata, such as Content-Type. One can also specify custom metadata at the time that the object is stored. Web services provide access to and from the cloud object storage service via the cloud storage service interface.

Figure 17:
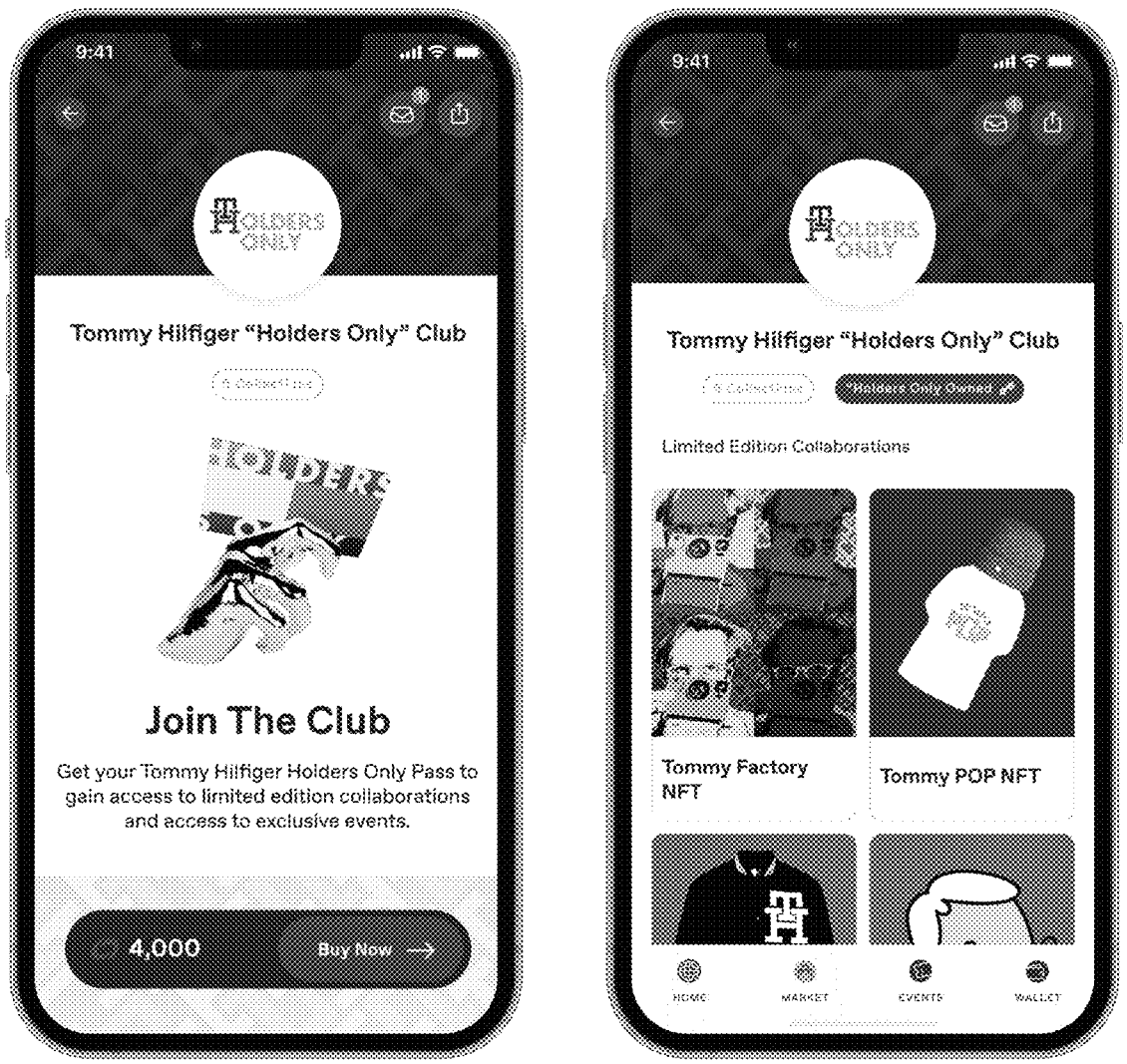
FIG. 17 is a depiction of the platform's clubs. Exclusive clubs are displayed on the market tab.

FIG. 17 is a depiction of the platform's clubs. Exclusive clubs are displayed on the market tab. Users may access limited edition collaborations, exclusive digital media and exclusive events if they purchase a club pass using the platform's desired currency. In some embodiments, access to these clubs may even be granted on the basis of a fan's engagement with a brand and/or performer. Limited edition NFTs collaborations are distinguished by a 'holder's only' tag.

Figure 18:
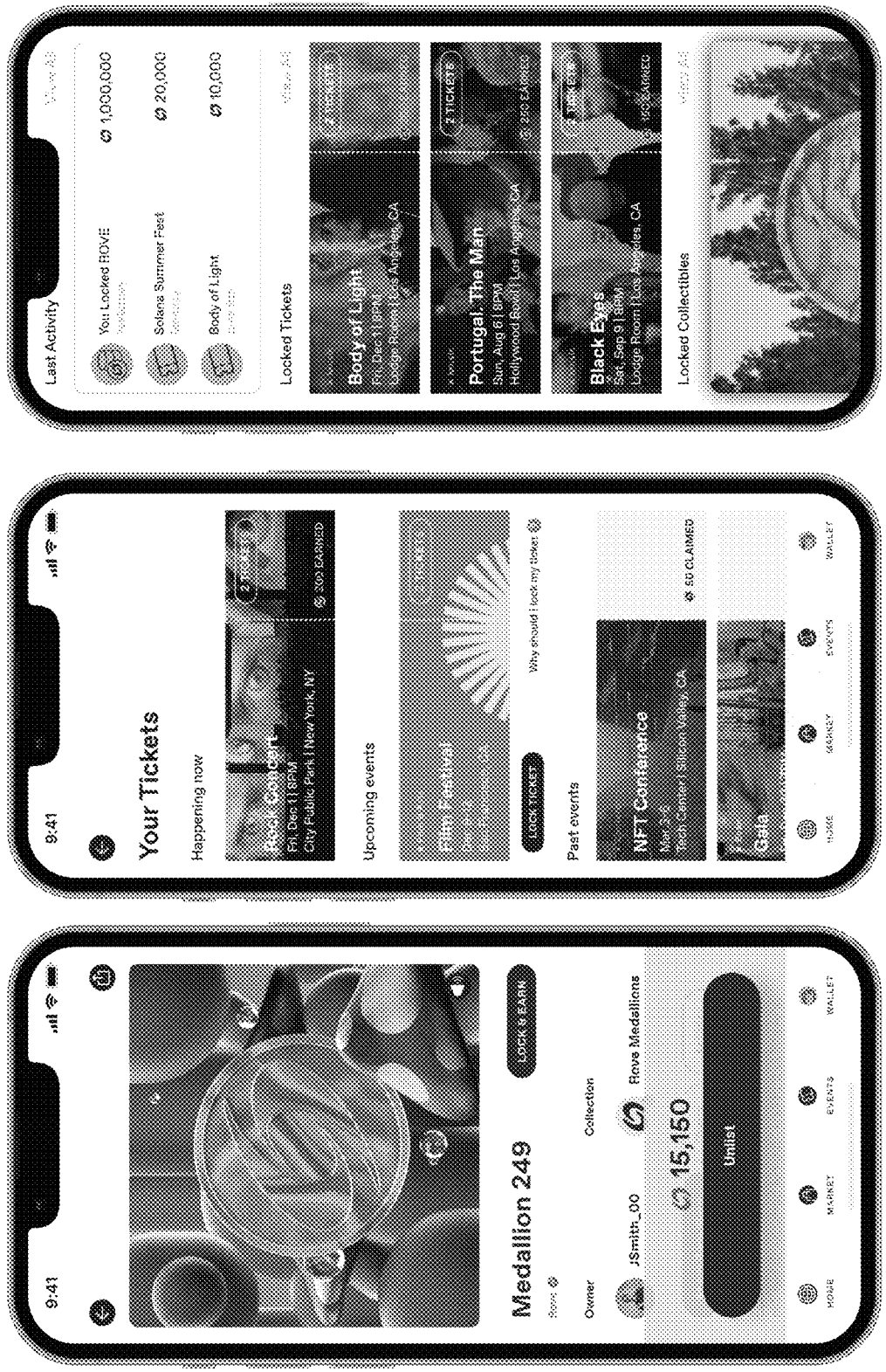
FIG. 18 is a depiction of the platform's wallet module.

FIG. 18 is a depiction of the platform's wallet module. The wallet module features tickets that are listed by the ticket owner as well as tickets for upcoming events. Tickets may be 'locked' to redirect them to the view wallet page. The view wallet page will then display an increased balance for claimed rewards, as well as an activity component for users to view their latest activity or begin a new transaction. The module will also display rewards claimed, for example, "You claimed X rewards from the Y event".

Figure 19:
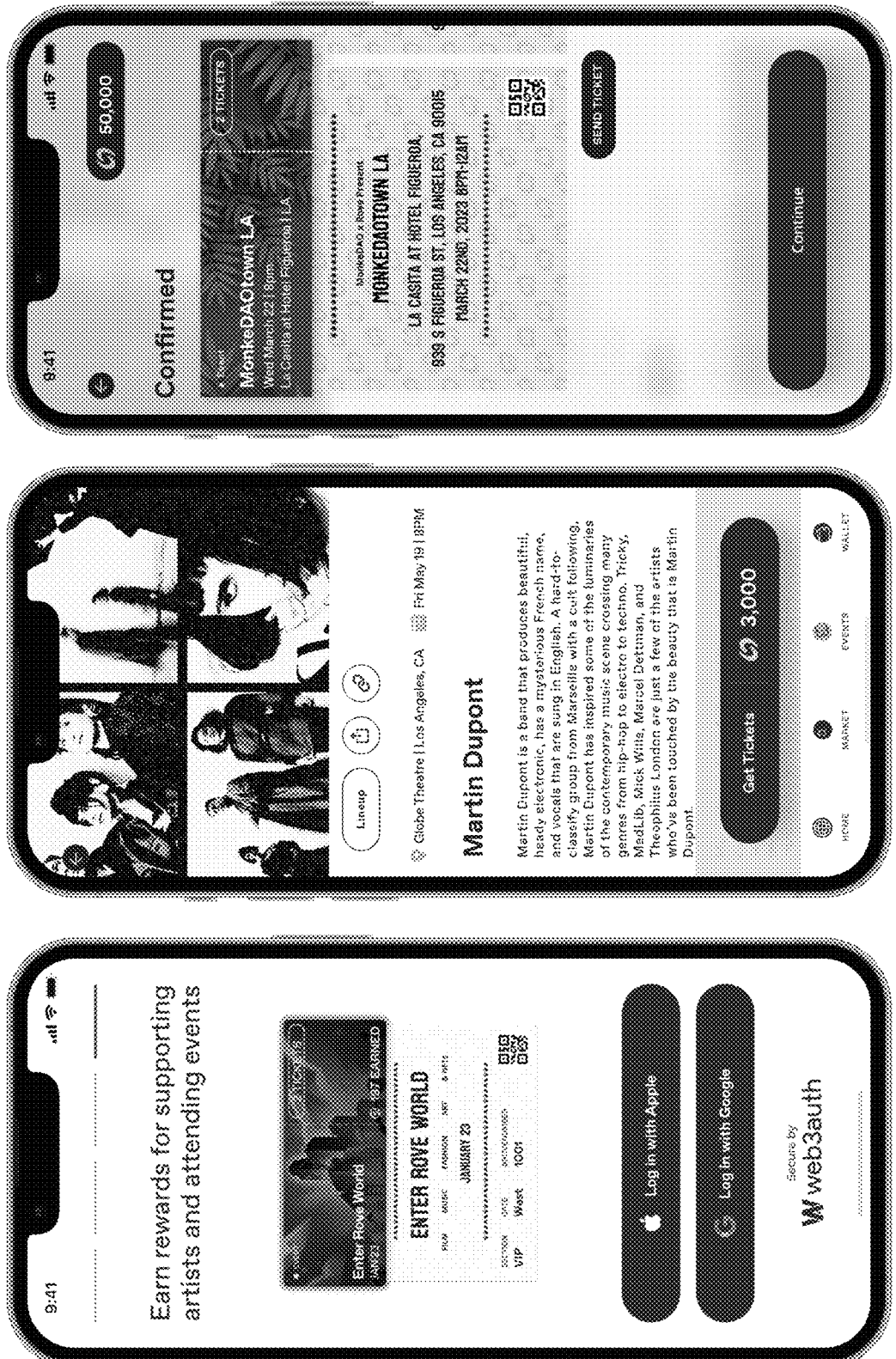
FIG. 19 is a ticket introduction page, an upcoming event with tickets for sale, and a confirmation ticket page.

FIG. 19 is a ticket introduction page, an upcoming event with tickets for sale, and a confirmation ticket page. Users may purchase tickets for a number of coins, either using the platform's cryptographic token or by using another form of currency. The event's details as well as a confirmation ticket are all provided to the purchaser.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for a blockchain-based digital ticketing platform, the system comprising:
   a processing device, configured to store and receive computer-programmable instructions and information, and wherein said processing device is blockchain-enabled,
   a decentralized platform, and wherein said decentralized platform is used to present events to see performers live, and wherein said performers can interact with fans on said decentralized platform,
   a distributed ledger, operating on said decentralized platform, to store and maintain data and transaction records, and wherein said distributed ledger features a database operating over a web service platform,
   an application interface, presented by way of said processing device, configured to enable a blockchain protocol by way of a plurality of nodes, and wherein said application interface displays a monetary balance, event dates for performers, including how many fans are to be in attendance,
   at least one network receiving a flow of data from a server to effectuate services on said application interface, and wherein the at least one network is a cryptocurrency network,
   a distributed hierarchical registry comprising a plurality of registry groups at a first level of the distributed hierarchical registry, and each of said plurality of registry groups comprising a plurality of registry servers;

a digital wallet to execute ticketing purchases for said events to see said performers, wherein said digital wallet records transactions and interactions that occur on said cryptocurrency network, and wherein said digital wallet enables a user to lock at least one ticket in exchange for at least one reward opportunity, wherein locking said at least one ticket comprises said user validating ownership of said at least one ticket and confirming a commitment to maintain said ownership; and a smart contract, operating on said distributed ledger, for storing contract parameters and executing said contract parameters upon validation, via blockchain-based biometric authentication for gating execution of said smart contract, that said contract parameters have been met, and wherein said contract parameters include a designated number of interactions between one of said fans and one of said performers as established by an administrator, wherein said administrator may be either one of said performers or an event host, wherein said system further comprises an artificial intelligence-enabled identity verification and transaction monitoring module configured to authenticate user identity prior to executing said smart contract and track document execution changes for auditability within a blockchain-enabled platform, and wherein a software module exists configured to allow for annotation and collaboration, enabling users to annotate documents within the blockchain-enabled platform for personal reference, permitting cross-collaborative annotations with other verified users, with said annotation stored and managed within the blockchain-enabled platform to preserve version history and auditability.

2. The system according to claim 1, wherein said database is hosted over a cloud-based server in connection with a peer-to-peer blockchain environment and at least one ticket wallet.

3. The system according to claim 2, wherein said ticket wallet and airdrop rewards provide rewards to said fans.

4. The system according to claim 1, wherein said digital wallet can execute a cryptographic transaction through a back-end at a discretion of a ticket purchaser.

5. The system according to claim 1, wherein said fans are assigned a fan status in said digital wallet by way of their interactions with said performer, and wherein said interactions includes a cryptographic transaction.

6. The system according to claim 1, wherein said ledger of said digital wallet is immutable and can be viewed by an admin to determine eligibility by way of terms of said smart contract to reap a reward through a reward system.

7. The system according to claim 6, wherein said rewards distributed through said reward system is air-dropped by way of said blockchain protocol and is validated by said system of nodes.

8. A method for a blockchain based digital ticketing platform, the method comprising of;
configuring a processing device to store and receive computer-readable instructions and information, and wherein said processing device is blockchain-enabled,
a processing device, configured to store and receive computer-programmable instructions and information, and wherein said processing device is blockchain-enabled,
a decentralized platform, and wherein said decentralized platform is used to present events to see performers live, and wherein said performers can interact with fans on said decentralized platform,
storing and maintaining transaction records on a distributed ledger operating on said decentralized platform, and wherein said distributed ledger features a database operating over a web service platform,
presenting an application interface, by way of said processing device, to enable a blockchain protocol by way of a plurality of nodes, and wherein said application interface displays a monetary balance, event dates for performers, including how many individuals are to be in attendance; and
receiving a flow of data over at least one network from a server to effectuate services on said application interface, and wherein the at least one network is a cryptocurrency network,
executing ticketing purchases through a digital wallet to attend said events to see said performers,
enabling, via said digital wallet, a user to lock at least one ticket in exchange for at least one reward opportunity, wherein locking said at least one ticket comprises said user validating ownership of said at least one ticket and confirming a commitment to maintain said ownership;
receiving client update information from client devices and responding to client lookup requests from client devices via a distributed hierarchical registry;
recording transactions and interactions that occur on said cryptocurrency network using said digital wallet; and
receiving terms from a performer or admin to generate a smart contract on said distributed ledger,
storing contract parameters;
executing said contract parameters;
authenticating user identity prior to executing said smart contract upon validation via blockchain-based biometric authentication for gating execution of said smart contract; and
tracking document execution changes for auditability within a blockchain-enabled platform via an artificial intelligence-enabled identity verification and transaction monitoring module.

9. The method according to claim 8, wherein said database is hosted over a cloud-based server in connection with a peer-to-peer blockchain environment and at least one ticket wallet.

10. The method according to claim 9, wherein said ticket wallet and airdrop rewards provide rewards to said fans.

11. The method according to claim 8, wherein said digital wallet can execute a cryptographic transaction through a back-end using discretion from a purchaser.

12. The method according to claim 8, wherein said fans are assigned a fan status in said digital wallet by way of their interactions with said performer, and wherein said interactions include a cryptographic transaction.

13. The method according to claim 8, wherein said ledger of said digital wallet is immutable and can be viewed by an admin to determine eligibility by way of said smart contract's terms to reap a reward through a reward system.

14. The method according to claim 13, wherein said rewards distributed through said reward system is air-dropped by way of said blockchain protocol and is validated by said system of nodes.

15. A method for a blockchain based digital ticketing platform, the method comprising of;
configuring a processing device to store and receive computer-programmable instructions and information, and wherein said processing device is blockchain-enabled, a processing device, configured to store and receive computer-programmable instructions and information, and wherein said processing device is blockchain-enabled, a decentralized platform, and wherein said decentralized platform is used to present events to see performers live, and wherein said performers can interact with fans on said decentralized platform, storing and maintaining transaction records on a data storage unit over a distributed ledger operating on said decentralized platform, and wherein said distributed ledger features a database operating over a web service platform, presenting an application interface, by way of said processing device, to enable a blockchain protocol by way of a plurality of nodes, and wherein said application interface displays a monetary balance, event dates for performers, including how many individuals are to be in attendance, receiving a flow of data over at least one network from a server to effectuate said services on said application interface, and wherein the at least one network is a cryptocurrency network, executing ticketing purchases through a digital wallet to attend said events to see said performers, enabling, via said digital wallet, a user to lock at least one ticket in exchange for at least one reward opportunity, wherein locking said at least one ticket comprises said user validating ownership of said at least one ticket and confirming a commitment to maintain said ownership;

recording transactions and fan interactions that occur on said cryptocurrency network using said digital wallet and application interface; and receiving terms from a performer or admin to generate a smart contract on said distributed ledger, receiving client update information from client devices and responding to client lookup requests from client devices via a distributed hierarchical registry comprising a plurality of registry groups at a first level of said distributed hierarchical registry, and each of said plurality of registry groups comprising a plurality of registry servers;

storing contract parameters, wherein said contract parameters include a threshold assigned by an admin with regards to a required number of events on said digital wallet belonging to one of said fans to determine eligibility for executing said smart contract upon validation, via blockchain-based biometric authentication for gating execution of said smart contract; and rewarding fans with non-fungible tokens, upon validation of said contract parameters;

authenticating user identity prior to executing said smart contract via an artificial intelligence-enabled identity verification and transaction monitoring module; and tracking document execution changes for auditability within a blockchain-enabled platform via an artificial intelligence-enabled verification and transaction monitoring module.

16. The method according to claim 15, wherein said non-fungible tokens comprise of pieces of media including exclusive song drops, behind the scenes and production content and music video footage.

17. The method according to claim 16, further comprising of said non-fungible tokens being airdropped into said digital wallets.

18. The method according to claim 15, wherein said digital wallet can execute a cryptographic transaction through a back-end using discretion from a purchaser.

19. The method according to claim 15, wherein said digital wallet can be shared by way of a QR code or blockchain ID.

20. The method according to claim 16, wherein said digital wallet is a data storage unit operating on a web 3 platform.

* * * * *